United States Patent
Choi et al.

(10) Patent No.: US 12,259,457 B2
(45) Date of Patent: Mar. 25, 2025

(54) ELECTRONIC DEVICE FOR EXPANDING SENSING BANDWIDTH BY INTEGRATING PLURALITY OF CHANNEL IMPULSE RESPONSES, AND CONTROL METHOD THEREFOR

(71) Applicant: Samsung Electronics Co., Ltd., Suwon-si (KR)

(72) Inventors: Junsu Choi, Suwon-si (KR); Sunkey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 17/957,661

(22) Filed: Sep. 30, 2022

(65) Prior Publication Data
US 2023/0023227 A1    Jan. 26, 2023

Related U.S. Application Data

(63) Continuation of application No. PCT/KR2021/003709, filed on Mar. 25, 2021.

(30) Foreign Application Priority Data

Apr. 16, 2020   (KR) ........................ 10-2020-0046254

(51) Int. Cl.
  *G01S 13/08*   (2006.01)
  *H04L 25/02*   (2006.01)
  *H04W 84/12*   (2009.01)
(52) U.S. Cl.
  CPC .......... *G01S 13/08* (2013.01); *H04L 25/0212* (2013.01); *H04W 84/12* (2013.01)
(58) Field of Classification Search
  CPC ..... G01S 13/08; H04L 25/0212; H04W 84/12
  See application file for complete search history.

(56) References Cited

U.S. PATENT DOCUMENTS

| 5,438,572 A | 8/1995 | Rauscher |
| 10,503,883 B1 | 12/2019 | Gillian et al. |

(Continued)

FOREIGN PATENT DOCUMENTS

| JP | 2008-524623 A | 7/2008 |
| KR | 10-0328145 B1 | 6/2002 |

(Continued)

OTHER PUBLICATIONS

Korean Notice of Allowance dated Feb. 1, 2024, issued in Korean Patent Application No. 10-2020-0046254.

*Primary Examiner* — Timothy A Brainard
*Assistant Examiner* — Maxine McKenzie Phillips
(74) *Attorney, Agent, or Firm* — Jefferson IP Law, LLP

(57) ABSTRACT

An electronic device is provided. The electronic device includes a first communication circuit, a second communication circuit, and at least one processor. The first communication circuit is configured to receive, in a first band, a first reflective signal reflected by an object, and obtain, based on the received first reflective signal, a first channel impulse response corresponding to the first reflective signal. The second communication circuit is configured to receive, in a second band, a second reflective signal reflected by the object, obtain, based on the received second reflective signal, a second channel impulse response corresponding to the second reflective signal, and obtain a third channel impulse response based on a first calculation using the second channel impulse response, a first central frequency of the first band and a second central frequency of the second band.

15 Claims, 15 Drawing Sheets

(56) References Cited

U.S. PATENT DOCUMENTS

| | | |
|---|---|---|
| 11,284,478 B2 | 3/2022 | Choi et al. |
| 2005/0047515 A1 | 3/2005 | Walton et al. |
| 2008/0281523 A1 | 11/2008 | Dahl et al. |
| 2013/0258873 A1 | 10/2013 | Stauffer et al. |
| 2015/0049836 A1 | 2/2015 | Li et al. |
| 2018/0180713 A1 | 6/2018 | Cohen et al. |
| 2019/0036559 A1* | 1/2019 | Wu .................. H04L 5/0091 |

FOREIGN PATENT DOCUMENTS

| | | |
|---|---|---|
| KR | 10-2011-0122885 A | 11/2011 |
| KR | 10-2013-0111487 A | 10/2013 |
| KR | 10-2014-0142312 A | 12/2014 |
| KR | 10-2019-0102441 A | 9/2019 |

* cited by examiner

ELECTRONIC DEVICE FOR EXPANDING SENSING BANDWIDTH BY INTEGRATING PLURALITY OF CHANNEL IMPULSE RESPONSES, AND CONTROL METHOD THEREFOR

CROSS-REFERENCE TO RELATED APPLICATION(S)

This application is a continuation application, claiming priority under § 365(c), of an International application No. PCT/KR2021/003709, filed on Mar. 25, 2021, which is based on and claims the benefit of a Korean patent application number 10-2020-0046254, filed on Apr. 16, 2020, in the Korean Intellectual Property Office, the disclosure of which is incorporated by reference herein in its entirety.

BACKGROUND

1. Field

The disclosure relates to an electronic device for expanding a sensing bandwidth by integrating multiple channel impulse responses, and a control method therefor.

2. Description of Related Art

Various services and additional functions provided via electronic devices, for example, a mobile electronic device, such as a smartphone, are gradually increasing. In order to increase the utility value of such electronic devices and satisfy the needs of various users, communication service providers or electronic device manufacturers offer various functions and develop electronic devices competitively to differentiate the same from other companies. Accordingly, various functions provided via electronic devices are becoming more advanced.

The above information is presented as background information only to assist with an understanding of the disclosure. No determination has been made, and no assertion is made, as to whether any of the above might be applicable as prior art with regard to the disclosure.

SUMMARY

Recently, a technology of utilizing a wireless local area network (WLAN), which is used for data communication, in a sensing field has been in the spotlight. Signals used in WLAN may have good characteristics in diffraction, reflection, or transmission when compared to infrared or visible light signals. Since a WLAN chipset is installed in most mobile devices for Internet connection, the installed WLAN chipset may be used without adding of a separate element for sensing. When WLAN is used for sensing, sensing may be possible with less power compared to an existing sensing technology using infrared or visible light.

An electronic device may receive various signals capable of sensing a surrounding environment. For example, the electronic device may transmit a signal to detect the surrounding environment and may receive signals generated by reflecting the transmitted signal by objects in the surrounding environment, or may receive signals generated by reflecting a signal, which another device (i.e., an external electronic device) has transmitted, by objects. The electronic device may perform channel estimation by calculating (or estimating) a channel response (i.e., a channel impulse response) from the received reflection signals, and may detect the surrounding environment via the same. For example, the electronic device may detect the surrounding environment so as to perform home monitoring, energy management, elder care, approach/walk-away sensing, gesture recognition, or biometric authentication (biometrics).

The channel impulse response may include at least one component having a high value (i.e., a peak) at a specific delay time point. Unlike an ideal case, in a practical case, a signal is transmitted and received in a finite bandwidth, and thus each component may affect a surrounding time component. For example, a spreading phenomenon in which each component affects a surrounding time component may occur. The spreading phenomenon has a characteristic inversely proportional to a size of a bandwidth in which a signal is transmitted and received, and it is necessary to use a signal in a wide bandwidth in order to ensure high resolution.

As for WLAN communication, starting from using a bandwidth of 20 MHz for each channel in the IEEE 802.11 standard specification, a bandwidth of up to 160 MHz may be used in the IEEE 802.11n, IEEE 802.11ac, and IEEE 802.11ax amendments. Using a bandwidth of up to 320 MHz is being discussed in the IEEE 802.11be amendment. In the IEEE 802.11be amendment, in addition to using a wide bandwidth of 320 MHz, a method of transmitting/receiving signals in multiple links via multi-link operation (MLO) technology is also discussed so that an available bandwidth of up to 640 MHz may be ensured.

The electronic device may receive reflection signals in different frequency bands (or channels) via the aforementioned IEEE 802.11be amendment or other methods, so as to calculate channel impulse responses from the respective reflection signals. For the electronic device, a method is being sought, the method enabling efficient integration of multiple channel impulse responses by using an existing electronic device structure while ensuring enhanced resolution under a limited bandwidth.

Aspects of the disclosure are to address at least the above-mentioned problems and/or disadvantages and to provide at least the advantages described below. Accordingly, an aspect of the disclosure is to provide an electronic device that calculates multiple channel impulse responses from the reflection signals received in multiple bands.

Another aspect of the disclosure is to provide an electronic device that acquires a channel impulse response obtained by integrating multiple channel impulse responses, by performing calculation based on frequency characteristics of respective bands for the multiple channel impulse responses.

Another aspect of the disclosure is to provide an electronic device that acquires a channel impulse response obtained by integrating multiple channel impulse responses by using an existing element (e.g., an application processor and/or a communication processor).

Additional aspects will be set forth in part in the description which follows and, in part, will be apparent from the description, or may be learned by practice of the presented embodiments.

In accordance with an aspect of the disclosure, an electronic device is provided. The electronic device includes a first communication circuit, a second communication circuit, and at least one processor operatively connected to the first communication circuit and the second communication circuit, wherein the first communication circuit is configured to receive, in a first band, a first reflection signal reflected by at least one object, and obtain, based on the received first reflection signal, a first channel impulse response corresponding to the first reflection signal, the second communication circuit is configured to receive, in a second band, a second reflection signal reflected by the at least one object, obtain, based on the received second reflection signal, a second channel impulse response corresponding to the second reflection signal, and obtain a third channel impulse response based on a first calculation using the second channel impulse response, a first frequency of the first band and a second frequency of the second band, and the at least one processor is configured to obtain a fourth channel impulse response based on the first channel impulse response and the third channel impulse response.

In accordance with another aspect of the disclosure, a method for controlling an electronic device is provided. The method includes receiving, in a first band, a first reflection signal reflected by at least one object, obtaining, based on the received first reflection signal, a first channel impulse response corresponding to the first reflection signal, receiving, in a second band, a second reflection signal reflected by the at least one object, obtaining, based on the received second reflection signal, a second channel impulse response corresponding to the second reflection signal, obtaining a third channel impulse response based on a first calculation using the second channel impulse response, a first frequency of the first band and a second frequency of the second band, and obtaining a fourth channel impulse response based on the first channel impulse response and the third channel impulse response.

In accordance with another aspect of the disclosure, an electronic device is provided. The electronic device includes a first communication circuit, a second communication circuit, and at least one processor operatively connected to the first communication circuit and the second communication circuit, wherein the first communication circuit is configured to receive, in a first band, a first reflection signal reflected by at least one object, and estimate, based on the received first reflection signal, a first channel impulse response corresponding to the first reflection signal, the second communication circuit is configured to receive, in a second band, a second reflection signal reflected by the at least one object, and estimate, based on the received second reflection signal, a second channel impulse response corresponding to the second reflection signal, and the at least one processor is configured to acquire, in response to the second channel impulse response, a third channel impulse response by performing calculation based on a first center frequency of the first band and a second center frequency of the second band, and acquire a fourth channel impulse response based on the first channel impulse response and the third channel impulse response.

An electronic device according to various embodiments calculates multiple channel impulse responses in multiple bands, so that wide bands can be used for sensing a surrounding environment.

The electronic device according to various embodiments can provide an effect of acquiring a channel impulse response in a wider band by performing calculation based on frequency characteristics of respective bands for multiple channel impulse responses.

The electronic device according to various embodiments can efficiently (or economically) integrate multiple channel impulse responses without adding a separate element, by using the existing element (e.g., an application processor and/or a communication processor).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
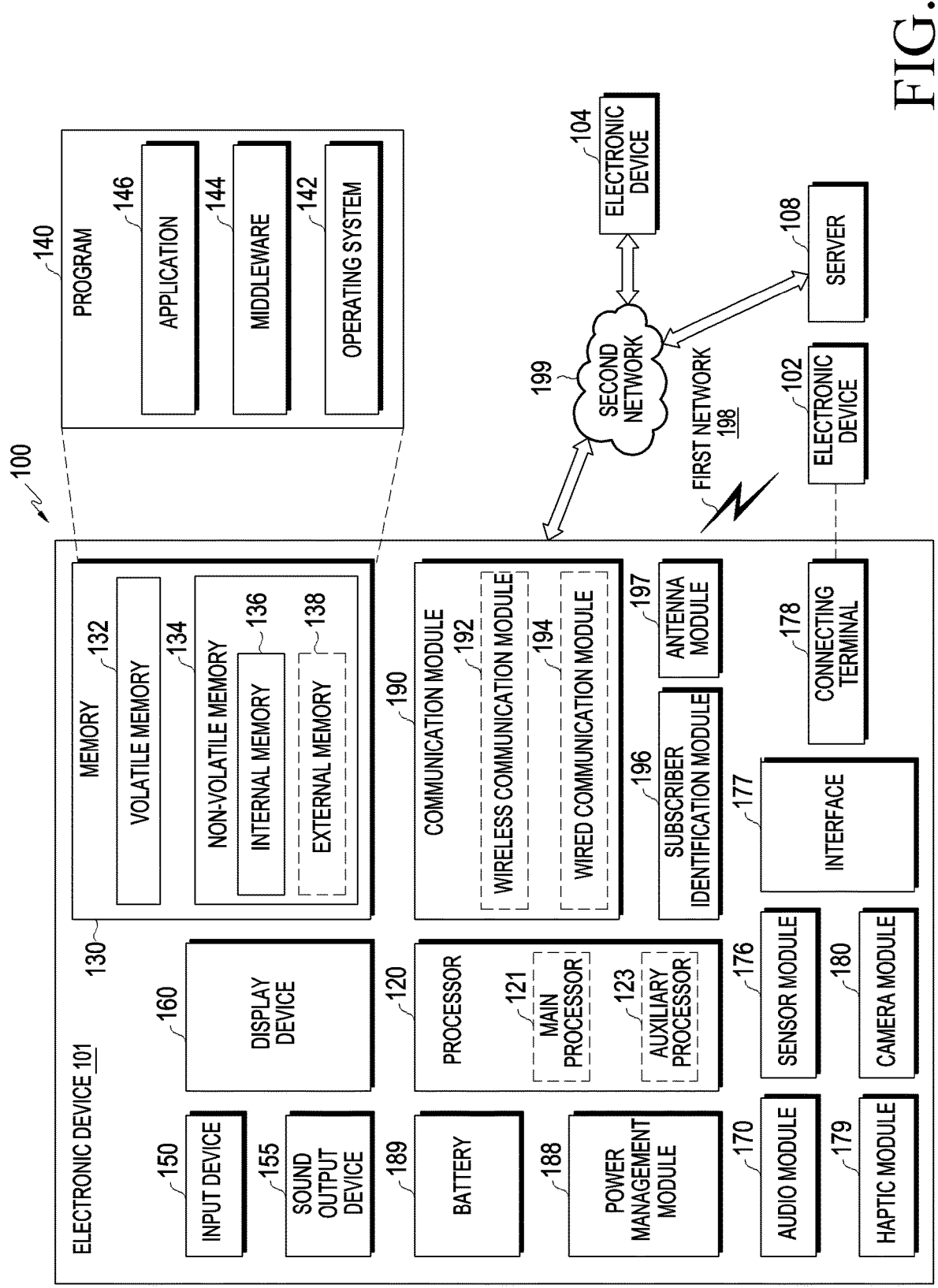
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module may include an antenna including a radiating element including a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
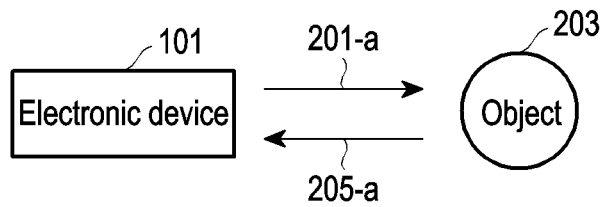
FIG. 2A is a diagram for illustrating a method of sensing a surrounding environment by an electronic device according to an embodiment of the disclosure.

FIG. 2A is a diagram for illustrating a method of sensing a surrounding environment by an electronic device according to an embodiment of the disclosure.

Referring to FIG. 2A, according to various embodiments of the disclosure, the electronic device 101 may transmit a signal 201-a. According to various embodiments of the disclosure, the signal 201-a may be a signal transmitted according to a WLAN communication scheme or other communication schemes. According to various embodiments of the disclosure, the WLAN communication scheme may be a communication scheme defined in the IEEE 802.11 standard specification. For example, the IEEE 802.11 standard specification may include at least one of the 802.11ax amendment and the 802.11be amendment. According to various embodiments of the disclosure, the signal 201-a may be described as a pilot signal or a communication signal.

According to various embodiments of the disclosure, the electronic device 101 may receive a reflection signal 205-a which is generated by reflection of the signal 201-a by an object 203. In the disclosure, there may be two or more objects 203. However, for the convenience of description, descriptions will be provided based on one object 203.

According to various embodiments of the disclosure, the electronic device 101 may acquire information on a surrounding environment (i.e., a propagation environment) from the received reflection signal 205-a. According to various embodiments of the disclosure, the electronic device 101 may acquire (or estimate) a channel impulse response from the received reflection signal 205-a, and may acquire information on the surrounding environment from the channel impulse response. For example, the electronic device 101 may acquire information on at least one of a signal delay, signal attenuation (i.e., a path loss), or a phase change due to the object 203 located in the surrounding environment.

According to various embodiments of the disclosure, the electronic device 101 may identify an attribute of the object 203 by using the acquired information on the surrounding environment. For example, the attribute of the object 203 may include at least one of the presence or absence of the object 203, a location of the object 203, a material of the object 203, a shape of the object 203, or a type of the object 203. According to various embodiments of the disclosure, the location of the object 203 may include a direction and/or distance in which the object 203 exists with respect to the electronic device 101.

Figure 2B:
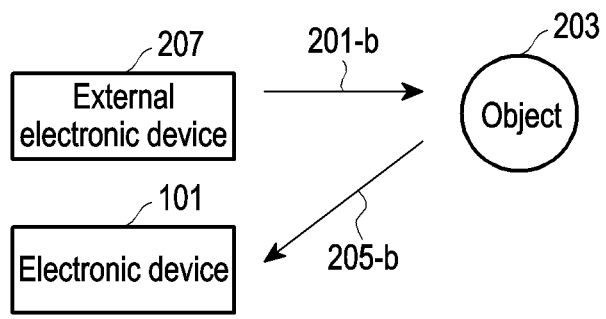
FIG. 2B is a diagram for illustrating a method of sensing a surrounding environment by an electronic device according to an embodiment of the disclosure.

FIG. 2B is a diagram for illustrating a method of sensing a surrounding environment by the electronic device 101 according to an embodiment of the disclosure. A description duplicated with that of FIG. 2A will be omitted.

Referring to FIG. 2B, according to various embodiments of the disclosure, the electronic device 101 may receive a reflection signal 205-b which is generated by reflection of a signal 201-b by the object 203, the signal 201-b being transmitted by an external electronic device 207 (e.g., the external electronic device 104 of FIG. 1).

According to various embodiments of the disclosure, the electronic device 101 may acquire information on the surrounding environment from the received reflection signal 205-b.

According to various embodiments of the disclosure, the electronic device 101 may identify the attribute of the object 203 by using the acquired information on the surrounding environment.

Referring to FIGS. 2A and 2B, it has been described that the signal 201-a or 201-b is classified as a signal transmitted by the electronic device 101 or the external electronic device 207. However, it may be understood by those skilled in the art that the electronic device 101 may receive both the reflection signal 205-a corresponding to the signal 201-a transmitted by the electronic device 101 and the reflection signal 205-b corresponding to the signal 201-b transmitted by the external electronic device 207, and may receive reflection signals corresponding to signals transmitted by multiple external electronic devices. In FIGS. 2A and 2B, for the convenience of description, one signal 201-a or 201-b and one reflection signal 205-a or 205-b are described, but there may be two or more the signals 201-a or 201-b or two or more reflection signals 205-a or 205-b. Hereinafter, for the convenience of description, it will be described that the reference numeral of the signal 201-a of FIG. 2A or the signal 201-b of FIG. 2B is 201, and the reference numeral of the reflection signal 205-a of FIG. 2A or the reflection signal 205-b of FIG. 2B is 205.

Figure 3:
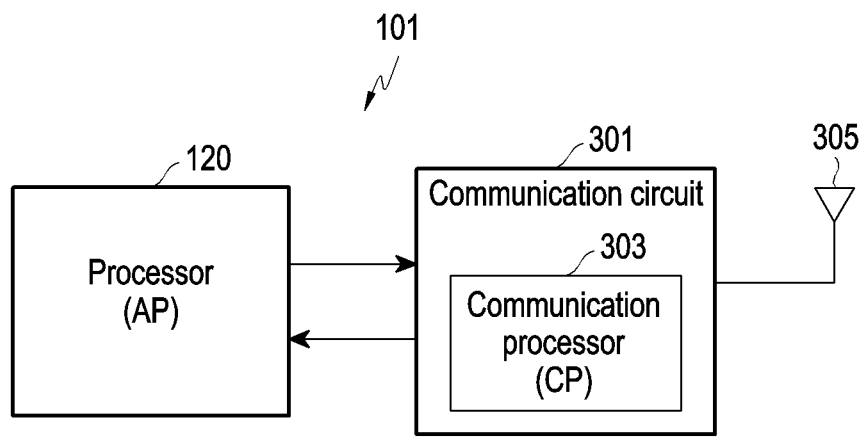
FIG. 3 is a block diagram for illustrating elements of an electronic device according to an embodiment of the disclosure.

FIG. 3 is a block diagram for illustrating elements of the electronic device 101 according to an embodiment of the disclosure.

According to various embodiments of the disclosure, the electronic device 101 may include at least one of the processor 120 (e.g., the processor 120 of FIG. 1), a communication circuit 301 (e.g., the wireless communication module 192 of FIG. 1), and an antenna 305 (e.g., the antenna module 197 of FIG. 1).

According to various embodiments of the disclosure, the processor 120 may perform and/or control overall operations of the electronic device 101. For example, the processor 120 may perform a specific operation of the electronic device 101 or may control another hardware (e.g., the communication circuit 301) to perform a specific operation. According to various embodiments of the disclosure, the processor 120 may be an application processor (AP).

According to various embodiments of the disclosure, the communication circuit 301 may wirelessly transmit and/or receive a signal, based on a WLAN communication scheme. According to various embodiments of the disclosure, the communication circuit 301 may include the communication processor 303 (e.g., the communication processor of FIG. 1). According to various embodiments of the disclosure, the communication circuit 301 may transmit and/or receive a radio signal under a control of the processor 120 and/or the communication processor 303. According to various embodiments of the disclosure, the communication circuit 301 may include at least one of a transmitter (e.g., a transmitter 401a of FIG. 4A) for transmitting a radio signal or a receiver (e.g., a receiver 401b of FIG. 4B) for receiving a radio signal. According to various embodiments of the disclosure, the communication circuit 301 including both a transmitter (e.g., the transmitter 401a of FIG. 4A) and a receiver (e.g., the receiver 401b of FIG. 4B) may be described as a transceiver. In the disclosure, elements of the transmitter and the receiver will be described in more detail with reference to FIGS. 4A and 4B.

According to various embodiments of the disclosure, the communication processor 303 may control the communication circuit 301 to perform a specific operation, or may process a signal to be transmitted and/or process a received signal.

According to various embodiments of the disclosure, the antenna 305 may transmit a signal from the communication circuit 301 to the outside or may receive a signal from the outside.

According to various embodiments of the disclosure, data may be transmitted and/or received between the processor 120 and the communication circuit 301. According to various embodiments of the disclosure, data transmission and/or reception between the processor 120 and the communication circuit 301 may be performed in a wired and/or wirelessly manner.

According to various embodiments of the disclosure, the communication circuit 301 and/or the antenna 305 may be plural. According to various embodiments of the disclosure, the electronic device 101 may include multiple communication circuits so as to transmit or receive signals respectively via multiple links (i.e., different bands). According to various embodiments of the disclosure, a technique for transmitting and/or receiving signals via multiple links by using multiple communication circuits may be described as an MLO technique. According to various embodiments of the disclosure, the MLO technique may include packet-level aggregation and/or flow-level aggregation. A case in which the communication circuit 301 and/or the antenna 305 are plural will be described in more detail with reference to FIG. 7.

Figure 4A:
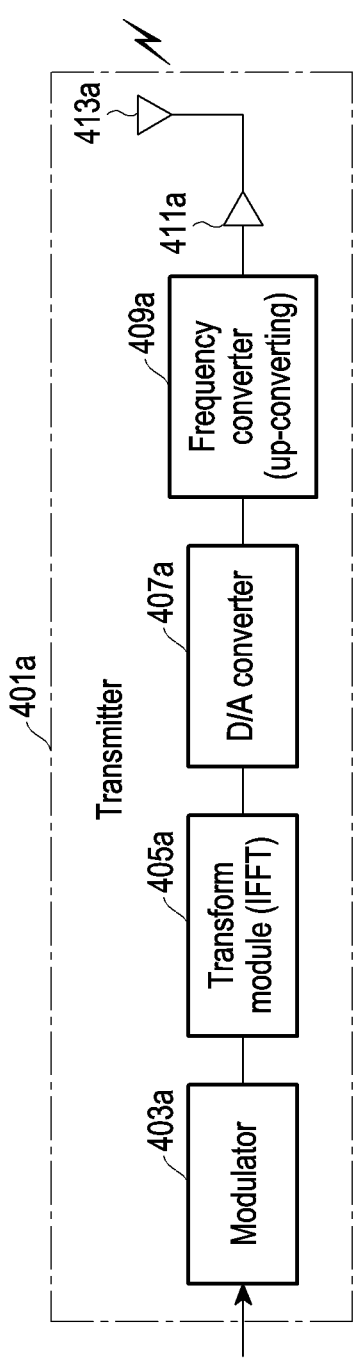
FIG. 4A is a block diagram for illustrating elements of a transmitter according to an embodiment of the disclosure.

FIG. 4A is a block diagram for illustrating elements of a transmitter 401a according to an embodiment of the disclosure.

Referring to FIG. 4A, the transmitter 401a may include at least one of a modulator 403a, a transform module 405a, a digital-analog (D/A) converter 407a, and a frequency converter 409a, an amplifier 411a, or an antenna 413a. In the disclosure, the transmitter 401a is described as elements according to orthogonal frequency division multiplexing (OFDM) or orthogonal frequency division multiple access (OFDMA). However, this is merely exemplary, and various other modulation schemes may be used. In the disclosure, for the convenience of description, a signal modulated and transmitted according to OFDM or OFDMA will be described as an OFDM signal.

According to various embodiments of the disclosure, the modulator 403a may modulate data. According to various embodiments of the disclosure, the modulator 403a may modulate data by mapping, to multiple symbols, bits corresponding to data received from a processor (e.g., the processor 120 of FIG. 1) or data generated by a communication processor (e.g., the communication processor 303 of FIG. 3). According to various embodiments of the disclosure, the modulator 403a may include at least one of a quadrature amplitude modulation (QAM) modulator, a binary phase-shift keying (BPSK) modulator, or a quadrature phase-shift keying (QPSK) modulator. According to various embodiments of the disclosure, data may include a physical layer data unit (PPDU).

According to various embodiments of the disclosure, the transform module 405a may transform modulated data into a time domain. According to various embodiments of the disclosure, the transform module 405a may perform an inverse Fourier transform (e.g., an inverse fast Fourier transform (IFFT)) on multiple symbols. According to various embodiments of the disclosure, the transform module 405a may transform and output the multiple symbols into the time domain, so that the multiple symbols may be transmitted via N sub-carriers. According to various embodiments of the disclosure, the transform module 405a may be described as an N-point IFFT according to the number N of sub-carriers for transmitting the multiple symbols. For example, N may be 32 or 64. According to various embodiments of the disclosure, a sampling rate for performing inverse Fourier transform may be determined according to the number N of sub-carriers. According to various embodiments of the disclosure, a sub-carrier may be described as a tone.

According to various embodiments of the disclosure, the aforementioned operations of the modulator 403a and/or the transform module 405a may be operations of a communication processor (e.g., the communication processor 303 of FIG. 3). According to various embodiments of the disclosure, at least some of the aforementioned operations of the modulator 403a and/or the transform module 405a may be performed by a processor (e.g., the processor 120 of FIG. 1). According to various embodiments of the disclosure, at least some of the aforementioned operations of the modulator 403a and/or the transform module 405a may be performed by another hardware element (e.g., a logic circuit) of the transmitter 401a, which is not illustrated.

According to various embodiments of the disclosure, the D/A converter 407a may convert a digital signal to an analog signal. According to various embodiments of the disclosure, the D/A converter 407a may receive a time domain output from the transform module 405a and convert the same into a baseband OFDM signal. The baseband OFDM signal may refer to a signal having a center frequency of 0. According to various embodiments of the disclosure, an operation of the D/A converter 407a may be performed by a processor (e.g., the processor 120 of FIG. 1) or a communication processor (e.g., the communication processor 303 of FIG. 3), and may be performed by another hardware element (e.g., a logic circuit) of the transmitter 401a, which is not illustrated.

According to various embodiments of the disclosure, the frequency converter 409a may convert a center frequency of a signal to be transmitted. According to various embodiments of the disclosure, the frequency converter 409a may convert a baseband OFDM signal, which is generated by the D/A converter 407a, to have a center frequency $f_c$ of a specific band (i.e., by increasing the center frequency to $f_c$), and may output the same. In the disclosure, a conversion operation of increasing the center frequency by the frequency converter 409a may be described as up-converting.

According to various embodiments of the disclosure, the amplifier 411a may amplify a signal. According to various embodiments of the disclosure, the amplifier 411a may amplify an OFDM signal output from the frequency converter 409a and output the same to the outside via the antenna 413a. According to various embodiments of the disclosure, the amplifier 411a may include a low-noise amplifier (LNA). According to various embodiments of the disclosure, the output signal may be transmitted via sub-carriers. According to various embodiments of the disclosure, each sub-carrier may be transmitted with a predefined amplitude and/or phase.

According to various embodiments of the disclosure, the antenna 413a may be described to have the same configuration as the antenna 305 of FIG. 3.

According to various embodiments of the disclosure, at least one of the frequency converter 409a or the amplifier 411a may be omitted.

Figure 4B:
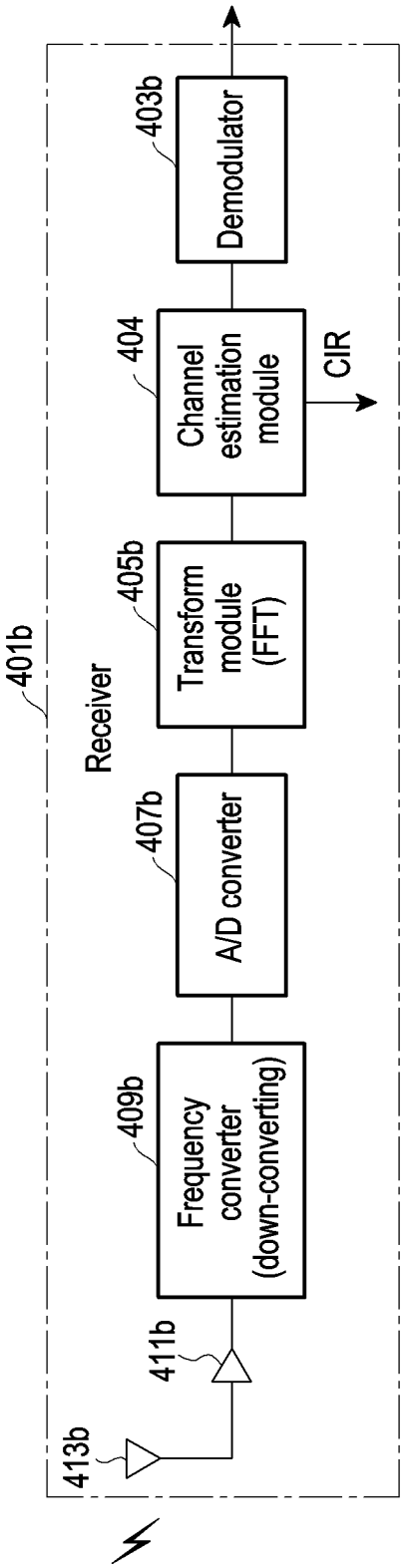
FIG. 4B is a block diagram for illustrating elements of a receiver according to an embodiment of the disclosure.

FIG. 4B is a block diagram for illustrating elements of a receiver 401b according to various an embodiment of the disclosure.

Referring to FIG. 4B, the receiver 401b may include at least one of an antenna 413b, an amplifier 411b, a frequency converter 409b, an analog-digital (A/D) converter 407b, a transform module 405b, a channel estimation module 404, or a demodulator 403b. In the disclosure, the receiver 401b is described as elements according to OFDM or OFDMA. However, this is merely exemplary, and various other demodulation schemes may be used. In the disclosure, for the convenience of description, a signal received and demodulated by the receiver 401b according to OFDM or OFDMA will be described as an OFDM signal.

According to various embodiments of the disclosure, the antenna 413b may receive a signal from the outside. According to various embodiments of the disclosure, the received signal may include a signal modulated according to OFDM (i.e., an OFDM signal). For example, the received signal may include at least one of a signal transmitted by an external electronic device (e.g., the external electronic device 207 of FIG. 2B) or a base station, or a reflection signal generated by reflection by an object (e.g., the object 203 of FIG. 2A or 2B). According to various embodiments of the disclosure, the received signal may be a signal (i.e., a bandpass signal) having a non-zero value $f_c$ as a center frequency. According to various embodiments of the disclosure, the antenna 413b may be described to have the same configuration as the antenna 305 of FIG. 3.

According to various embodiments of the disclosure, the amplifier 411b may amplify a signal. According to various embodiments of the disclosure, the amplifier 411b may amplify a signal received via the antenna 413b and transfer the same to the frequency converter 409b. According to various embodiments of the disclosure, gain of the amplifier 411b may be adjusted via an automatic gain control procedure (AGC). For example, the receiver 401b may adjust the gain of the amplifier 411b by using information included in a short training field (STF) or legacy STF (L-STF) of the received signal. According to various embodiments of the disclosure, the amplifier 411b may include an LNA.

According to various embodiments of the disclosure, the frequency converter 409b may convert a center frequency of the received signal. According to various embodiments of the disclosure, the frequency converter 409b may convert a signal (i.e., a bandpass signal), which has a non-zero value $f_c$ as the center frequency, into a baseband signal (i.e., decreasing the center frequency to zero). In the disclosure, a conversion operation of decreasing the center frequency by the frequency converter 409b may be described as down-converting.

According to various embodiments of the disclosure, the A/D converter 407b may convert an analog signal to a digital signal. According to various embodiments of the disclosure, a baseband signal received from the frequency converter 409b may be converted to a digital signal. According to various embodiments of the disclosure, an operation of the A/D converter 407b may be performed by a processor (e.g., the processor 120 of FIG. 1) or a communication processor (e.g., the communication processor 303 of FIG. 3), and may be performed by another hardware element (e.g., a logic circuit) of the receiver 401b, which is not illustrated.

According to various embodiments of the disclosure, the transform module 405b may transform a digital signal received from the A/D converter 407b into a frequency spectrum form. According to various embodiments of the disclosure, the transform module 405b may perform a Fourier transform (e.g., a fast Fourier transform (FFT)) on the digital signal. According to various embodiments of the disclosure, the transform module 405b may transform multiple symbols transmitted via N sub-carriers into a frequency spectrum form (i.e., into a frequency domain) and may output the same. According to various embodiments of the disclosure, the transform module 405b may be described as an N-point FFT according to the number N of sub-carriers. For example, N may be 32 or 64. According to various embodiments of the disclosure, a sampling rate for performing Fourier transform may be determined according to the number N of sub-carriers.

According to various embodiments of the disclosure, the channel estimation module 404 may perform estimation (i.e., channel estimation) for a channel through which a signal is transmitted. According to various embodiments of the disclosure, the channel estimation module 404 may calculate a channel function from multiple symbols which are transformed into a frequency spectrum form and output. According to various embodiments of the disclosure, the channel estimation module 404 may identify amplitudes and/or phases of sub-carriers of the received signals. According to various embodiments of the disclosure, the channel estimation module 404 may identify the amplitudes and/or phases of sub-carriers transferring specific fields (e.g., a high efficiency long training field (HE-LTF)) of the received signals, and may calculate the channel function by comparing the identified amplitudes and/or phases with predefined amplitudes and/or phases of sub-carriers. According to various embodiments of the disclosure, the channel estimation module 404 may estimate a channel impulse response (CIR) in the time domain by performing an inverse Fourier transform (e.g., an inverse fast Fourier transform) on the calculated channel function. According to various embodiments of the disclosure, the operation of estimating the channel impulse response may be described as a channel estimation operation or a sensing operation for a surrounding environment (or a propagation environment). According to various embodiments of the disclosure, the channel estimation module 404 may provide the estimated channel impulse response to the processor (e.g., the processor 120 of FIG. 1) and/or the communication processor (e.g., the communication processor 303 of FIG. 3). According to various embodiments of the disclosure, if the receiver 401b includes a separate hardware element that processes the estimated channel impulse response, the channel estimation module 404 may provide the estimated channel impulse response to the separate hardware element. According to various embodiments of the disclosure, the processor (e.g., the processor 120 of FIG. 1) and/or the communication processor (e.g., the communication processor 303 of FIG. 3) may acquire information on the surrounding environment by using the estimated channel impulse response. According to various embodiments of the disclosure, the channel estimation module 404 may further include an equalizer (not illustrated). According to various embodiments of the disclosure, the equalizer (not illustrated) may output data in the frequency domain, from which a channel affect has been removed, to the demodulator 403b, based on the calculated channel function.

According to various embodiments of the disclosure, the demodulator 403b may receive data in the frequency domain, which has been outputted based on a channel estimation result, and may demodulate the received data. According to various embodiments of the disclosure, the demodulator 403b may demodulate the received data by mapping bits corresponding to the received data (e.g., symbols). According to various embodiments of the disclosure, the demodulator 403b may include at least one of a QAM demodulator, a BPSK demodulator, or a QPSK demodulator. According to various embodiments of the disclosure, the demodulator 403b may output demodulated data to the processor (e.g., the processor 120 of FIG. 1) and/or the communication processor (e.g., the communication processor 303 of FIG. 3). According to various embodiments of the disclosure, the output data may include a PPDU.

According to various embodiments of the disclosure, the aforementioned operations of the demodulator 403b, the channel estimation module 404, and/or the transform module 405b may be operations of the communication processor (e.g., the communication processor 303 of FIG. 3). According to various embodiments of the disclosure, at least some of the aforementioned operations of the demodulator 403b, the channel estimation module 404, and/or the transform module 405b may be performed by the processor (e.g., the processor 120 of FIG. 1). According to various embodiments of the disclosure, at least some of the aforementioned operations of the demodulator 403b, the channel estimation module 404, and/or the transform module 405b may be performed by another hardware element (e.g., a logic circuit) of the receiver 401b, which is not illustrated. According to various embodiments of the disclosure, a channel impulse response may be acquired by transmitting a signal including a complementary sequence, receiving a reflection signal corresponding thereto, and performing auto-correlation with respect to the complementary sequence included in the reflection signal.

According to various embodiments of the disclosure, the transmitter 401a and the receiver 401b described in FIGS. 4A and 4B may be included in one electronic device or may be separately included in different electronic devices. For example, both the transmitter 401a and the receiver 401b may be included in the communication circuit (e.g., the communication circuit 301 of FIG. 3) of the electronic device (e.g., the electronic device 101 of FIG. 1). For example, the transmitter 401a may be included in an external electronic device (e.g., the external electronic device 207 of FIG. 2B), and the receiver 401b may be included in the communication circuit (e.g., the communication circuit 301 of FIG. 3) of the electronic device (e.g., the electronic device 101 of FIG. 1).

Figure 5:
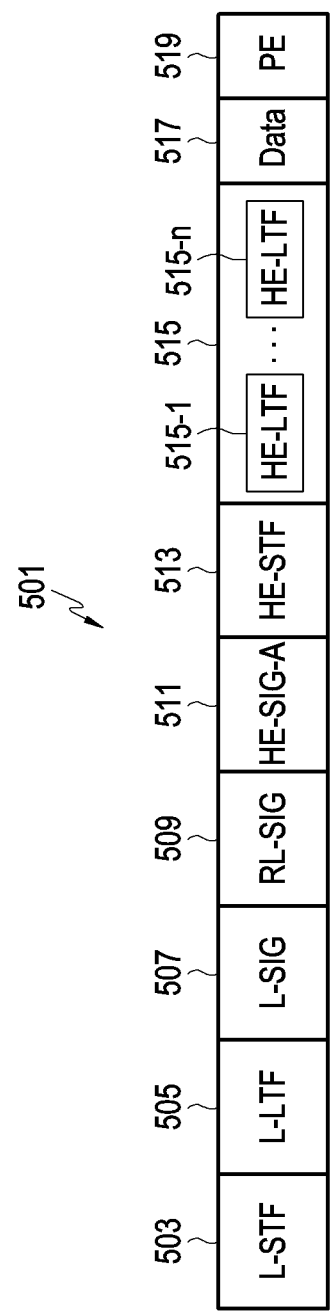
FIG. 5 is a diagram for illustrating a structure of a physical layer data unit (PPDU) according to an embodiment of the disclosure.

FIG. 5 is a diagram for illustrating a structure of a PPDU 501 according to an embodiment of the disclosure.

Referring to FIG. 5, according to various embodiments of the disclosure, the PPDU 501 of FIG. 5 has a structure of a data packet defined in IEEE 802.11ax, and may be a high efficiency PPDU (HE-PPDU). According to various embodiments of the disclosure, the PPDU 501 may be a PPDU for a multi-user multi-input multi-output (MU-MIMO) operation of an electronic device (e.g., the electronic device 101 of FIG. 1) or an external electronic device (e.g., the external electronic device 207 of FIG. 2B).

According to various embodiments of the disclosure, a signal transmitted by a transmitter (e.g., the transmitter 401a of FIG. 4A) and/or a signal received by a receiver (e.g., the receiver 401b of FIG. 4B) may include the PPDU 501 including at least one field.

According to various embodiments of the disclosure, the PPDU 501 may include at least one of a legacy short training field (L-STF) 503, a legacy long training field (L-LTF) 505, a legacy signal (L-SIG) field 507, a repeated legacy signal (RL-SIG) field 509, a high efficiency signal A (HE-SIG-A) field 511, a high efficiency short training field (HE-STF) 513, a high efficiency long training field (HE-LTF) 515, a data field 517, or a packet extension (PE) field 519.

According to various embodiments of the disclosure, the L-STF 503, the L-LTF 505, and the L-SIG field 507 may be described as fields constituting a legacy preamble. According to various embodiments of the disclosure, the legacy preamble may include information enabling the receiver (e.g., the receiver 401b of FIG. 4B) to perform a preparation operation necessary for data packet reception.

According to various embodiments of the disclosure, the L-STF 503 may include a specific repeated sequence and may be a field used for start-of-packet detection, automatic gain control (AGC), initial frequency offset estimation, and/or initial time synchronization.

According to various embodiments of the disclosure, the L-LTF 505 may be a field used for channel estimation, more accurate frequency offset estimation, and/or more accurate time synchronization.

According to various embodiments of the disclosure, the L-SIG field 507 may be a field including rate, length, and parity information.

According to various embodiments of the disclosure, the RL-SIG field 509 may be inserted before the HE-SIG-A field 511 and may be a field for classifying, as an HE-PPDU, a data format of the PPDU 501.

According to various embodiments of the disclosure, the HE-SIG-A field 511 may be a field including information indicating whether the PPDU 501 is a downlink (DL) PPDU transmitted from an access point (AP), or an uplink (UL) PPDU transmitted from a station (STA).

According to various embodiments of the disclosure, the HE-STF 513 may be a field used to improve performance of automatic gain control in multi-input multi-output (MIMO) transmission.

According to various embodiments of the disclosure, the HE-LTF 515 may be a field used by the receiver (e.g., the receiver 401b of FIG. 4B) to estimate an MIMO channel According to various embodiments of the disclosure, the HE-LTF 515 may include n HE-LTF symbols 515-1, . . . , or 515-n having different durations. According to various embodiments of the disclosure, the operation of the channel estimation module 404 of FIG. 4B may be performed by identifying a degree of changes in an amplitude and/or phase of sub-carrier corresponding to each HE-LTF symbol (515-1, . . . , or 515-n) with respect to a predefined amplitude and/or phase.

According to various embodiments of the disclosure, the data field 517 may be a field used for data communication. According to various embodiments of the disclosure, the data field 517 may include data (i.e., a payload of a medium access control (MAC) layer) to be transferred to the receiver (e.g., the receiver 401b of FIG. 4B). According to various embodiments of the disclosure, the data field 517 may be empty when the PPDU 501 is used for sensing of a surrounding environment (i.e., a propagation environment) other than data communication. According to various embodiments of the disclosure, the data field 517 may include additional information used when sensing a surrounding environment (i.e., a propagation environment). For example, the additional information may include information on a time point at which a signal (e.g., the signal 201 of FIG. 2A or 2B) is transmitted.

According to various embodiments of the disclosure, the PE field 519 may be a field used to guarantee a time for processing the received PPDU 501 by the receiver (e.g., the receiver 401b of FIG. 4B).

Figure 6A:
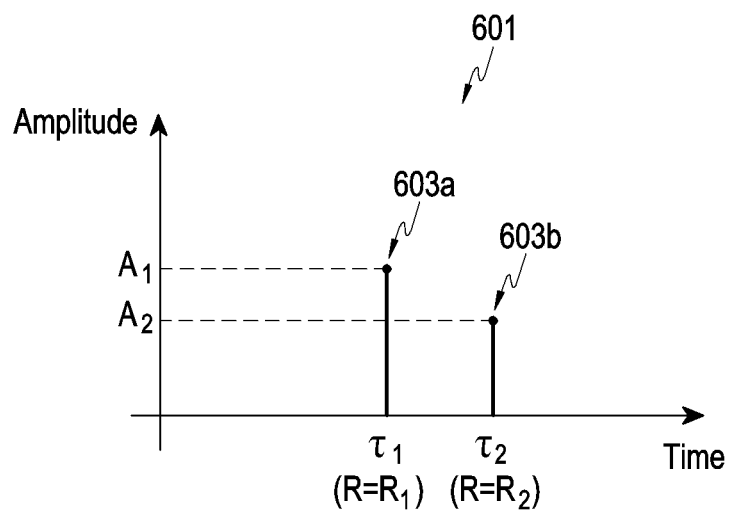
FIG. 6A is a diagram for illustrating a channel impulse response according to an embodiment of the disclosure.

FIG. 6A is a diagram for illustrating a channel impulse response 601 according to an embodiment of the disclosure.

According to various embodiments of the disclosure, the channel impulse response 601 may be a sequence on the time domain including at least one component 603a and/or 603b.

Referring to FIG. 6A, for the convenience of description, two components 603a and 603b are illustrated, but 3 or more components may constitute the channel impulse response 601.

According to various embodiments of the disclosure, each of the components 603a and 603b may have a characteristic having a high value (i.e., a peak) at a specific delay time. According to various embodiments of the disclosure, a delay time τ1 or τ2 may be a time (i.e., time of flight (ToF)) from a time point at which a signal (e.g., the signal 201 of FIG. 2A or 2B) is transmitted by an electronic device (e.g., the electronic device 101 of FIG. 1) or an external electronic device (e.g., the external electronic device 207 of FIG. 2B) to a time point at which a reflection signal (e.g., the reflection signal 205 of FIG. 2A or 2B) generated by reflection by an object (e.g., the object 203 of FIG. 2A or 2B) located in the vicinity is received. According to various embodiments of the disclosure, a distance from the electronic device (e.g., the electronic device 101 of FIG. 1) to the object (e.g., the object 203 of FIG. 2A or 2B) may be calculated via Equation 1.

$$R = \frac{\tau \times c}{2}$$ Equation 1

In Equation 1, R may denote a distance from the electronic device (e.g., the electronic device 101 of FIG. 1) to the object (e.g., the object 203 of FIG. 2A or 2B), τ may denote a delay time (e.g., $\tau_1$, $\tau_2$), and c may denote a speed of electromagnetic waves (≈3.0×10$^8$ m/s). For example, if a flight time is 1 ns, the distance from the electronic device (e.g., the electronic device 101 of FIG. 1) to the object (e.g., the object 203 of FIG. 2A or 2B) may be 15 cm.

According to various embodiments of the disclosure, components 603a and 603b may correspond to respective sub-carriers that transmit symbols. According to various embodiments of the disclosure, an amplitude (height) of each component 603a or 603b may indicate a degree of signal attenuation (i.e., a path loss) due to the object (e.g., the object 203 of FIG. 2A or 2B) located around the electronic device 101. According to various embodiments of the disclosure, the degree of signal attenuation may be expressed as a ratio of decrease in a signal magnitude. For example, in the first component 603a having a delay time corresponding to $\tau_1$, a degree (ratio) of decrease in the signal magnitude due to the object with distance $R_1$ may be $A_1$. For example, in the second component 603b having a delay time corresponding to $\tau_2$, a degree (ratio) of decrease in the signal magnitude due to the object with distance $R_2$ may be $A_2$.

According to various embodiments of the disclosure, each of the components 603a and 603b may indicate a degree of a phase change due to the object (e.g., the object 203 of FIG. 2A or 2B) located around the electronic device 101. According to various embodiments of the disclosure, the degree of the phase change corresponding to each of the components 603a and 603b may be different.

Figure 6B:
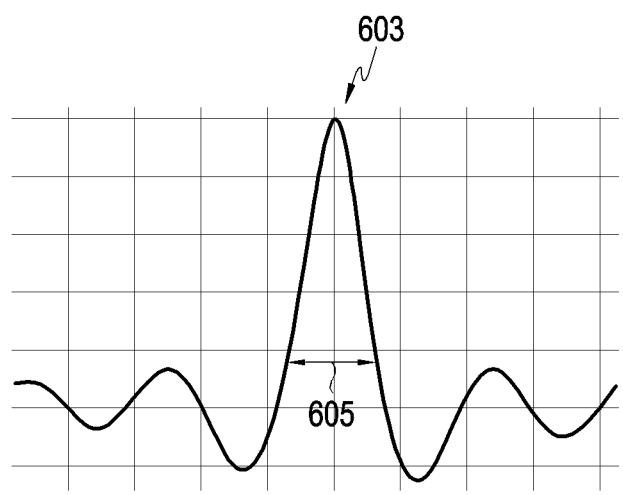
FIG. 6B is a diagram for illustrating a component of a channel impulse response according to an embodiment of the disclosure.

FIG. 6B is a diagram for illustrating a component 603 of a channel impulse response according to an embodiment of the disclosure.

Referring to FIG. 6B, the illustrated component 603 represents one component (e.g., the component 603a or 603b of FIG. 6A) of a channel impulse response (e.g., the channel impulse response 601 of FIG. 6A). According to various embodiments of the disclosure, the illustrated component 603 may be a component of a case in which a signal is received in a finite (i.e., limited) bandwidth. According to various embodiments of the disclosure, when a signal is received in an infinite (i.e., unlimited) bandwidth, as illustrated in FIG. 6A, each component (e.g., the component 603a or 603b of FIG. 6A) may have a characteristic having a high value only at a specific delay time, while, when a signal is received in a finite (i.e., limited) bandwidth, as illustrated in FIG. 6B, the component 603 may be in a form affecting not only a specific delay time but also a surrounding time component of the channel impulse response. According to various embodiments of the disclosure, the form of the component 603, which affects a surrounding time component may be described as a spreading phenomenon. According to various embodiments of the disclosure, a degree 605 of a spreading phenomenon may be inversely proportional to a size of a bandwidth in which a signal is transmitted and/or received. For example, as the size of the bandwidth increases, the degree 605 of spreading phenomenon may be small, and as the size of the bandwidth decreases, the degree 605 of spreading phenomenon may be large. According to various embodiments of the disclosure, when the degree of spreading phenomenon is large, the component 603 may have a large influence on the surrounding time component so that accuracy of acquiring information on a signal delay, signal attenuation, and/or a phase change may be reduced, and a resolution of sensing the surrounding environment may be lowered as a result.

Figure 7:
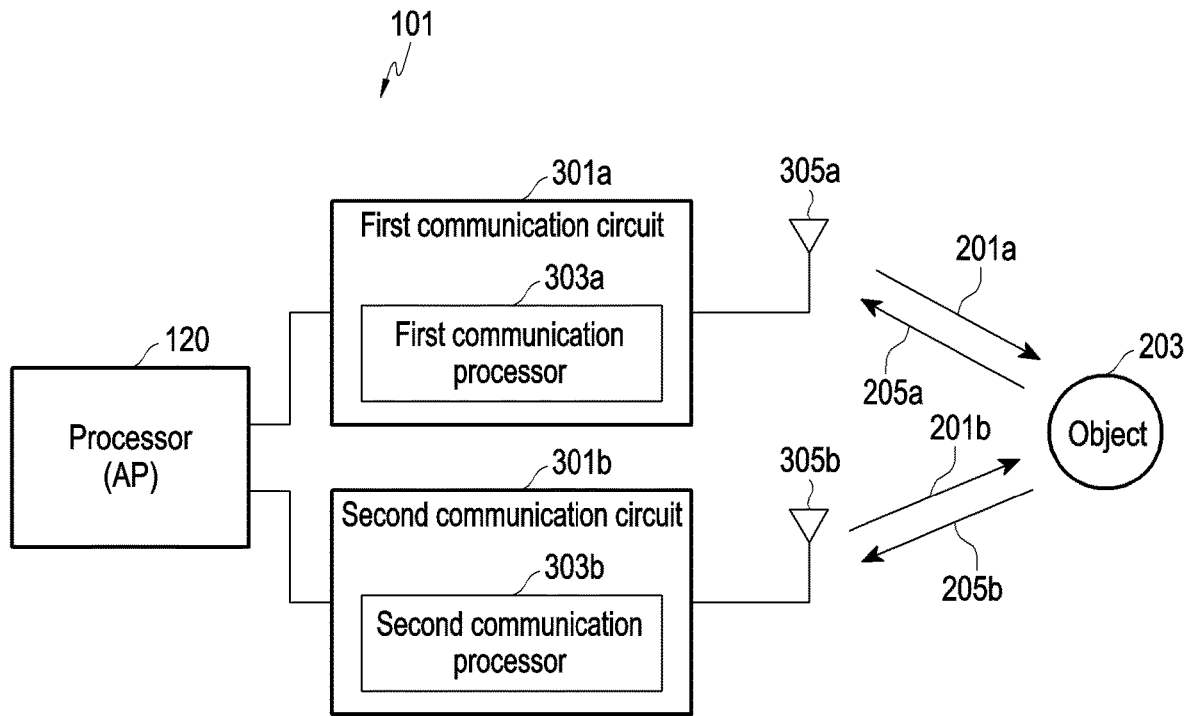
FIG. 7 is a diagram for illustrating a method of sensing a surrounding environment by an electronic device according to an embodiment of the disclosure.

FIG. 7 is a diagram for illustrating a method of sensing a surrounding environment by an electronic device according to an embodiment of the disclosure.

Referring to FIG. 7, according to various embodiments of the disclosure, the electronic device 101 may include at least one of the processor 120, a first communication circuit 301a, a second communication circuit 301b, a first antenna 305a, or a second antenna 305b.

According to various embodiments of the disclosure, the first communication circuit 301a or the second communication circuit 301b may be described in the same way as the communication circuit 301 of FIG. 3. According to various embodiments of the disclosure, a first communication processor 303a or a second communication processor 303b may be described in the same way as the communication processor 303 of FIG. 3. According to various embodiments of the disclosure, the first antenna 305a or the second antenna 305b may be described in the same way as the antenna 305 of FIG. 3.

According to various embodiments of the disclosure, the first communication circuit 301a or the second communication circuit 301b may be configured to transmit and/or receive a signal via multiple links (i.e., different bands) according to an MLO. For example, the first communication circuit 301a may transmit a signal (e.g., a first signal 201a) in a first band, and the second communication circuit 301b may transmit a signal (e.g., a second signal 201b) in a second band. For example, the first communication circuit 301a may receive a signal (e.g., a first reflection signal 205a) in the first band, and the second communication circuit 301b may receive a signal (e.g., a second reflection signal 205b) in the second band. According to various embodiments of the disclosure, the second band may have a higher frequency than the first band. For example, a center frequency of the first band may be different from a center frequency of the second band.

According to various embodiments of the disclosure, the signal transmission and/or reception of the first communication circuit 301a and the signal transmission and/or reception of the second communication circuit 301b may be performed concurrently or sequentially. According to various embodiments of the disclosure, the first band and the second band may be different frequency bands or may be different channels within the same frequency band. For example, the first band may be one channel in a 5 GHz band, and the second band may be one channel in a 6 GHz band. For example, the first band may be an m-th channel within the 6 GHz band, and the second band may be an n-th channel within the same 6 GHz band. According to various embodiments of the disclosure, transmission of the first signal 201a and/or reception of the first reflection signal 205a may be performed via the first antenna 305a, and transmission of the second signal 201b and/or reception of the second reflection signal 205b may be performed via the second antenna 305b.

According to various embodiments of the disclosure, the first communication processor 303a of the first communication circuit 301a may acquire (estimate) a first channel impulse response from a signal (e.g., the first reflection signal 205a) received in the first band. According to various embodiments of the disclosure, the second communication processor 303b of the second communication circuit 301b may acquire (estimate) a second channel impulse response from a signal (e.g., the second reflection signal 205b) received in the second band. According to various embodiments of the disclosure, the first channel impulse response and the second channel impulse response may be acquired (estimated) in parallel.

According to various embodiments of the disclosure, the electronic device 101 may include one communication processor in place of the separated first communication processor 303a and second communication processor 303b. According to various embodiments of the disclosure, one communication processor may be included in one of the first communication circuit 301a or the second communication circuit 301b, or may be included in a form of an additional chip separated from the first communication circuit 301a or the second communication circuit 301b.

According to various embodiments of the disclosure, the first communication circuit 301a and the second communication circuit 301b may be included in a form of a single chip.

According to various embodiments of the disclosure, when FIG. 2B is also referred to, at least one of the first reflection signal 205a or the second reflection signal 205b may be a reflection signal corresponding to a signal transmitted by an external electronic device (e.g., the external electronic device 207 of FIG. 2B) other than the electronic device 101.

According to various embodiments of the disclosure, if at least one of the first communication circuit 301a or the second communication circuit 301b does not include a transmitter (e.g., the transmitter 401a of FIG. 4A) and includes a receiver (e.g., the receiver 401b of FIG. 4B), at least one of the first signal 201a or the second signal 201b may not be transmitted.

According to various embodiments of the disclosure, if at least one of the first communication circuit 301a or the second communication circuit 301b does not include a receiver (e.g., the receiver 401b of FIG. 4B) and includes a transmitter (e.g., the transmitter 401a of FIG. 4A), at least one of the first reflection signal 205a and the second reflection signal 205b may be received by an external electronic device (e.g., the external electronic device 207 of FIG. 2B) other than the electronic device 101.

Figure 8:
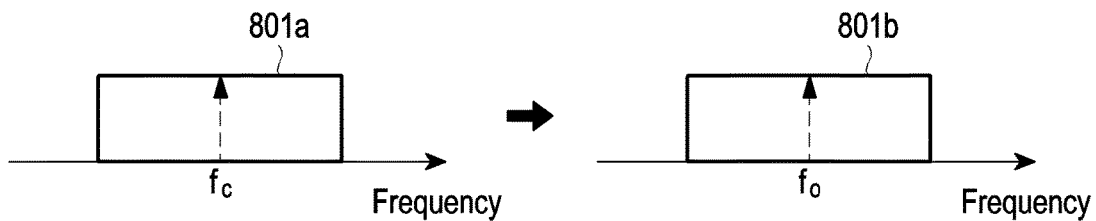
FIG. 8 is a diagram for illustrating an operation of converting a center frequency by a first communication circuit or a second communication circuit according to an embodiment of the disclosure.

FIG. 8 is a diagram for illustrating an operation of converting a center frequency by a first communication circuit or a second communication circuit according to an embodiment of the disclosure.

Referring to FIG. 8, according to various embodiments of the disclosure, the first communication circuit (e.g., the first communication circuit 301a of FIG. 7) or the second communication circuit (e.g., the second communication circuit 301b of FIG. 7) may include a frequency converter (e.g., the frequency converter 409a of FIG. 4A or the frequency converter 409b of FIG. 4B). Reference numeral 801a may be a frequency spectrum of a signal having a center frequency of $f_c$, and reference numeral 801b may be a frequency spectrum having a center frequency of $f_0$. For example, $f_0$ may be 0.

According to various embodiments of the disclosure, the first communication circuit (e.g., the first communication circuit 301a of FIG. 7) or the second communication circuit (e.g., the second communication circuit 301b of FIG. 7) may receive signals having different center frequencies (e.g., the first reflection signal 205a or the second reflection signal 205b of FIG. 7). According to various embodiments of the disclosure, Fourier transform and/or inverse Fourier transform operations of a transform module (e.g., the transform module 405a of FIG. 4A or the transform module 405b of FIG. 4B) or a channel estimation module (e.g., the channel estimation module 404 of FIG. 4B) may be performed on a baseband signal. According to various embodiments of the disclosure, the first communication circuit (e.g., the first communication circuit 301a of FIG. 7) or the second communication circuit (e.g., the second communication circuit 301b of FIG. 7) may change a center frequency of the received signal by using the frequency converter (e.g., the frequency converter 409b of FIG. 4B). For example, the first communication circuit (e.g., the first communication circuit 301a of FIG. 7) or the second communication circuit (e.g., the second communication circuit 301b of FIG. 7) may lower a center frequency of each received signal to $f_0$. For example, the frequency spectrum 801a of the signal having the center frequency of $f_c$ may be changed to the frequency spectrum 801b having the center frequency of $f_0$.

According to various embodiments of the disclosure, an electronic device (e.g., the electronic device 101 of FIG. 1) may acquire, in parallel, multiple channel impulse responses (e.g., the first channel impulse response or the second channel impulse response of FIG. 7) from the first reflection signal or the second reflection signal converted into a baseband signal. A simple summation of the acquired multiple channel impulse responses may not be helpful in terms of resolution improvement in sensing a surrounding environment. For example, when the first communication circuit (e.g., the first communication circuit 301a of FIG. 7) or the second communication circuit (e.g., the second communication circuit 301b of FIG. 7) receives signals (e.g., the first reflection signal 205a or the second reflection signal 205b of FIG. 7) in a band having the same bandwidth, the acquired multiple channel impulse responses may include components (e.g., reference numeral 603 of FIG. 6B) having the same degree (e.g., reference numeral 605 of FIG. 6B) of spreading phenomenon. Since the acquired multiple channel impulse responses are a result of performing Fourier transform and/or inverse Fourier transform operations under the baseband, even if the multiple channel impulse responses are summed, the degree of spreading phenomenon (e.g., reference numeral 605 of FIG. 6B) may not be decreased. Accordingly, even if the acquired multiple channel impulse responses are used, this may not help to improve the resolution of sensing the surrounding environment.

Figure 9A:
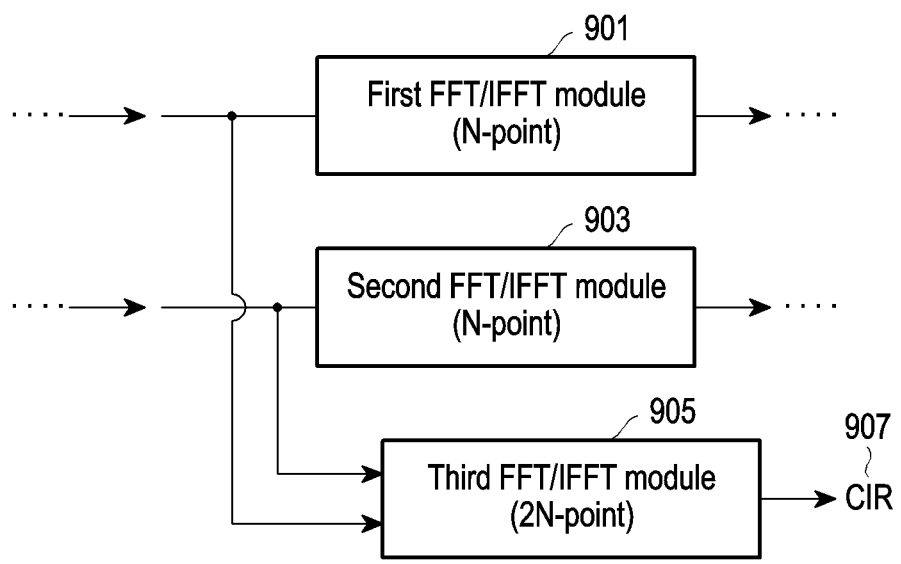
FIG. 9A is a diagram of a comparative embodiment for illustrating an operation in which an electronic device acquires an improved channel impulse response via a separate element according to an embodiment of the disclosure.
Figure 9B:
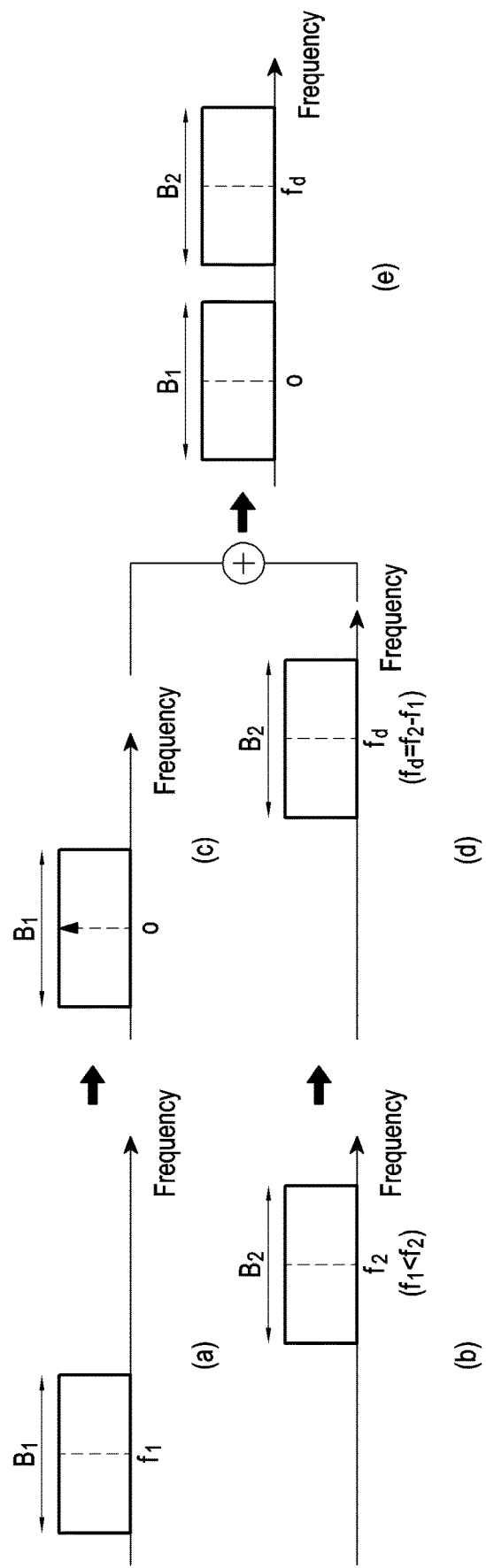
FIG. 9B is a diagram of a comparative embodiment for illustrating an operation in which an electronic device acquires an improved channel impulse response via a separate module according to an embodiment of the disclosure.

FIG. 9A is a diagram of a comparative embodiment for illustrating an operation of acquiring an improved channel impulse response via a separate element by an electronic device according to an embodiment of the disclosure. FIG. 9B is a diagram of a comparative embodiment for illustrating an operation of acquiring an improved channel impulse response via a separate module (e.g., a third FFT/IFFT module 905) by an electronic device (e.g., the electronic device 101 of FIG. 1) according to an embodiment of the disclosure. Hereinafter, descriptions will be provided with reference to both FIGS. 9A and 9B.

Referring to FIG. 9A, an electronic device (e.g., the electronic device 101 of FIG. 1) may include a first FFT/IFFT module 901, a second FFT/IFFT module 903, and a third FFT/IFFT module 905. According to an embodiment of the disclosure, each of the first FFT/IFFT module 901 and the second FFT/IFFT module 903 may include the transform module 405b and the channel estimation module 404 of FIG. 4B.

Referring to part (a) of FIG. 9B, it illustrates a frequency spectrum of a first reflection signal (e.g., the first reflection signal 205a of FIG. 7) received via a first communication circuit (e.g., the first communication circuit 301a of FIG. 7). According to an embodiment of the disclosure, the first reflection signal (e.g., the first reflection signal 205a of FIG. 7) may have a center frequency $f_c$ of $f_1$ and a bandwidth of $B_1$.

Referring to part (b) of FIG. 9B, it illustrates a frequency spectrum of a second reflection signal (e.g., the second reflection signal 205b of FIG. 7) received via a second communication circuit (e.g., the second communication circuit 301b of FIG. 7). According to an embodiment of the disclosure, the second reflection signal (e.g., the second reflection signal 205b of FIG. 7) may have a center frequency $f_c$ of $f_2$ and a bandwidth of $B_2$. According to an embodiment of the disclosure, bandwidth $B_1$ and bandwidth $B_2$ may be the same.

Referring to part (c) of FIG. 9B, illustrates a frequency spectrum of a first baseband signal generated via a frequency converter (e.g., the frequency converter 409b of FIG. 4B). According to an embodiment of the disclosure, the frequency converter (e.g., the frequency converter 409b of FIG. 4B) may generate a first baseband signal by converting the center frequency $f_c$ of the received first reflection signal (e.g., the first reflection signal 205a of FIG. 7) from $f_1$ to 0.

Referring to part (d) of FIG. 9B, illustrates a frequency spectrum of a passband signal. According to an embodiment of the disclosure, the third FFT/IFFT module 905 may generate a passband signal by converting the center frequency $f_c$ of the received second reflection signal (e.g., the second reflection signal 205b of FIG. 7) from f2 to fd. According to an embodiment of the disclosure, $f_d$ may be a difference value between the center frequency $f_1$ of the first reflection signal (e.g., the first reflection signal 205a of FIG. 7) and the center frequency $f_2$ of the second reflection signal (e.g., the second reflection signal 205b of FIG. 7).

Referring to part (e) of FIG. 9B illustrates a frequency spectrum of a sum signal generated by summing the first baseband signal and the passband signal. According to an embodiment of the disclosure, the third FFT/IFFT module 905 may generate the sum signal by summing the generated passband signal and the first baseband signal generated by the frequency converter (e.g., the frequency converter 409b of FIG. 4B).

According to an embodiment of the disclosure, the third FFT/IFFT module 905 may acquire (estimate) an improved channel impulse response (e.g., CIR 907) from the generated sum signal.

The spreading phenomenon has a characteristic inversely proportional to a size of a bandwidth in which a signal is transmitted and received, and therefore high resolution may be obtained using a signal in a wide bandwidth. According to an embodiment of the disclosure, an improved channel impulse response (e.g., CIR 907) is acquired from a sum signal having a wide bandwidth (e.g., $B_1+B_2$ or greater), and thus a result, in which a degree (e.g., reference numeral 605 of FIG. 6B) of a spreading phenomenon is decreased and resolution of sensing a surrounding environment is increased, may be provided.

When both FIGS. 4B and 7 are referred to, for the aforementioned methods, in addition to the elements of FIGS. 4B and 7, an additional element (e.g., the third FFT/IFFT module 905) may be required, the additional element being configured to perform an additional operation of converting a second reflection signal (e.g., the second reflection signal 205b of FIG. 7) having a center frequency of f2 into a bandpass signal having a center frequency of fd, and perform a Fourier transform and/or an inverse Fourier transform on sub-carriers twice (e.g., 2N) sub-carriers processed by the first FFT/IFFT module 901 or the second FFT/IFFT 903 with respect to a sum signal having a wide bandwidth (e.g., B1+B2 or greater).

In other words, if an improved channel impulse response (e.g., CIR 907) is acquired based on a difference $f_d$ between the center frequencies of the first signal and the second signal according to the aforementioned methods, a result of an increase in resolution of sensing a surrounding environment may be provided, but the third FFT/IFFT module 905, such as a separate communication processor (e.g., the first communication processor 303a or the second communication processor 303b) may be required to perform the aforementioned additional operations.

Figure 10A:
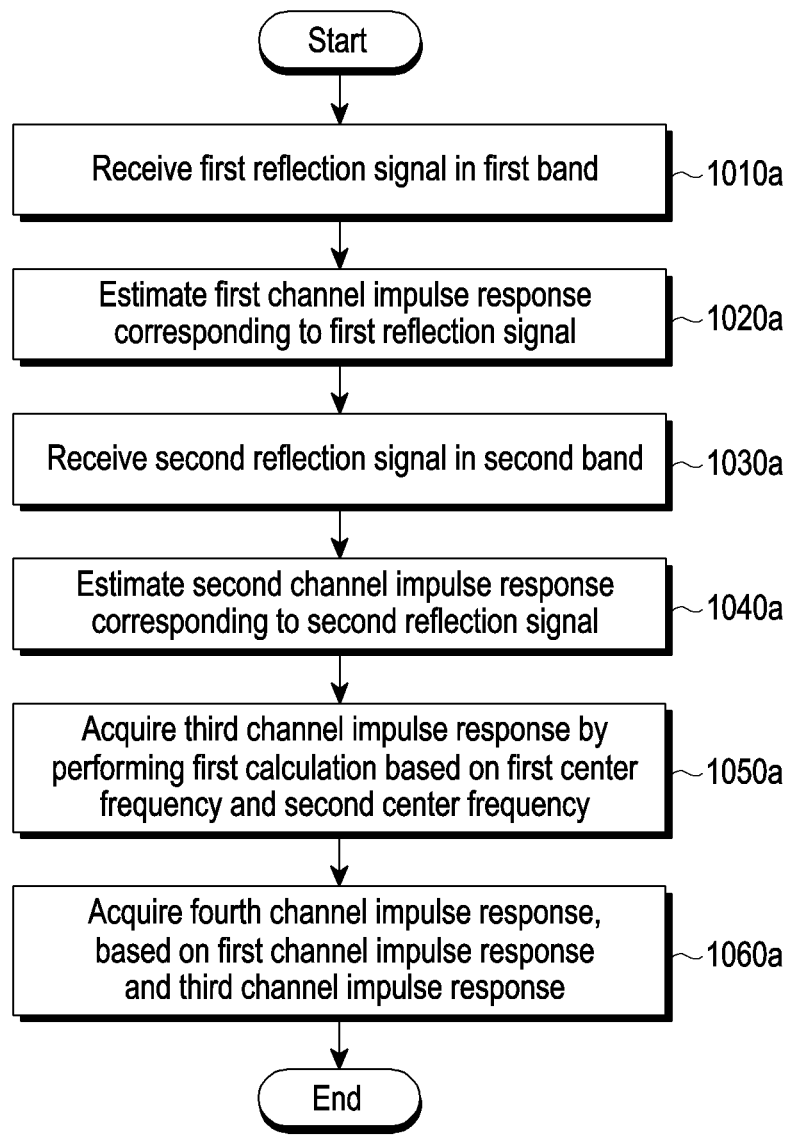
FIG. 10A is a flowchart for illustrating a method of acquiring an improved channel impulse response by an electronic device according to an embodiment of the disclosure.
Figure 10B:
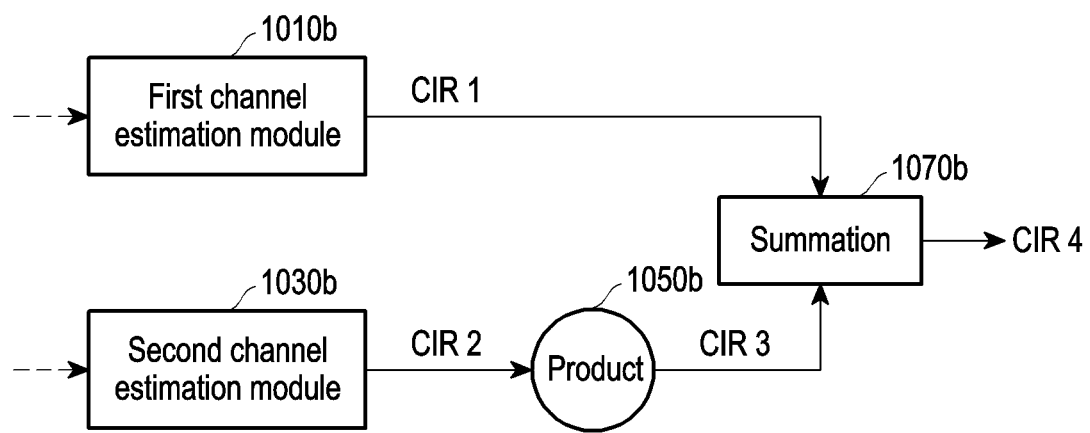
FIG. 10B is a diagram for illustrating a method of acquiring an improved channel impulse response by an electronic device according to an embodiment of the disclosure.

FIG. 10A is a flowchart for illustrating a method of acquiring an improved channel impulse response by an electronic device according to an embodiment of the disclosure. FIG. 10B is a diagram for illustrating a method of acquiring an improved channel impulse response by an electronic device according to an embodiment of the disclosure. Hereinafter, descriptions will be provided with reference to both FIGS. 10A and 10B.

Referring to FIGS. 10A and 10B, a first channel estimation module 1010b may be an element included in the first communication processor 303a of FIG. 7. According to various embodiments of the disclosure, a second channel estimation module 1030b may be an element included in the second communication processor 303b of FIG. 7. According to various embodiments of the disclosure, the first channel estimation module 1010b and/or the second channel estimation module 1030b may be described in the same way as the channel estimation module 404 of FIG. 4B.

According to various embodiments of the disclosure, in operation 1010a, an electronic device (e.g., the electronic device 101 of FIG. 1) may receive a first reflection signal (e.g., the first reflection signal 205a of FIG. 7) in a first band (e.g., the first band of FIG. 7).

According to various embodiments of the disclosure, in operation 1020a, the electronic device (e.g., the electronic device 101 of FIG. 1) may estimate a first channel impulse response (e.g., CIR 1) corresponding to the first reflection signal (e.g., the first reflection signal 205a of FIG. 7). For example, the electronic device (e.g., the electronic device 101 of FIG. 1) may estimate the first channel impulse response (e.g., CIR 1) by performing Fourier transform and inverse Fourier transform operations on the received first reflection signal (e.g., the first reflection signal 205a of FIG. 7) in a baseband, by using the first channel estimation module 1010b.

According to various embodiments of the disclosure, in operation 1030a, the electronic device (e.g., the electronic device 101 of FIG. 1) may receive a second reflection signal (e.g., the second reflection signal 205b of FIG. 7) in a second band (e.g., the second band of FIG. 7).

According to various embodiments of the disclosure, in operation 1040a, the electronic device (e.g., the electronic device 101 of FIG. 1) may estimate a second channel impulse response (e.g., CIR 2) corresponding to the second reflection signal (e.g., the second reflection signal 205b of FIG. 7). For example, the electronic device (e.g., the electronic device 101 of FIG. 1) may estimate the second channel impulse response (e.g., CIR 2) by performing Fourier transform and inverse Fourier transform operations on the received second reflection signal (e.g., the second reflection signal 205b of FIG. 7) in the baseband by using the second channel estimation module 1030b.

According to various embodiments of the disclosure, in operation 1050a, the electronic device (e.g., the electronic device 101 of FIG. 1) may acquire a third channel impulse response (e.g., CIR 3) by performing a first calculation (e.g., the product 1050b) based on a first center frequency and a second center frequency. For example, the first center frequency may be a center frequency $f_1$ of the first band (e.g., the first band of FIG. 7). For example, the second center frequency may be a center frequency $f_2$ of the second band (e.g., the second band of FIG. 7). For example, the first calculation (e.g., the product 1050b) may be a calculation in the time domain based on a difference $f_d$ between the first center frequency $f_1$ and the second center frequency $f_2$. For example, the first calculation (e.g., the product 1050b) may be a calculation of Equation 2.

$$\text{CIR } 3 = \text{CIR } 2 \times e^{j2\pi f_d t} \quad \text{Equation 2}$$

In Equation 2, j may be an imaginary constant. $F_d$ may be a difference ($f_2 - f_1$) between a center frequency of the first reflection signal and a center frequency of the second reflection signal. T may be a sampling time for performing of a Fourier transform (e.g., a fast Fourier transform) and an inverse Fourier transform (e.g., an inverse fast Fourier transform).

$e^{j2\pi f_d t}$ of Equation 2 may be defined as Equation 3 by Euler's formula.

$$e^{j2\pi f_d t} = \cos 2\pi f_d t + j \sin 2\pi f_d t \quad \text{Equation 3}$$

According to various embodiments of the disclosure, the calculation of Equation 2 may result in a center frequency shifted by $+f_d$ in terms of a frequency spectrum. According to various embodiments of the disclosure, based on the calculation of Equation 2, a third channel impulse response (e.g., CIR 3) obtained by shifting the center frequency by $+f_d$ in the second channel impulse response (e.g., CIR 2) may be acquired.

According to various embodiments of the disclosure, in operation 1060a, the electronic device (e.g., the electronic device 101 of FIG. 1) may acquire a fourth channel impulse response (e.g., CIR 4), based on the first channel impulse response (e.g., CIR 1) and the third channel impulse response (e.g., CIR 3). According to various embodiments of the disclosure, the electronic device (e.g., the electronic device 101 of FIG. 1) may acquire the fourth channel impulse response (e.g., CIR 4) by performing a second calculation (e.g., the summation 1070b) of summing the first channel impulse response (e.g., CIR 1) and the third channel impulse response (e.g., CIR 3). According to various embodiments of the disclosure, based on Equation 3, since the fourth channel impulse response (e.g., CIR 4) is acquired by summing the first channel impulse response (e.g., CIR 1) and the third channel impulse response (e.g., CIR 3) in which the center frequency has been shifted by $+f_d$, when a surrounding environment is detected using the fourth channel impulse response (e.g., CIR 4), the same effect as sensing the surrounding environment in a bandwidth up to twice a bandwidth of each of the first band and the second band may be provided.

According to various embodiments of the disclosure, operation 1030a may be performed together with operation 1010a and/or operation 1020a or may be performed before operation 1010a and/or operation 1020a. According to various embodiments of the disclosure, operation 1040a may be performed together with operation 1010a and/or operation 1020a or may be performed before operation 1010a and/or operation 1020a.

According to various embodiments of the disclosure, the first calculation (e.g., the product 1050b) and/or the second calculation (e.g., the summation 1070b) may be performed by at least one of a processor (e.g., the processor 120 of FIG. 1) or a second communication processor (e.g., the second communication processor 303b of FIG. 7). This will be described in more detail with reference to FIGS. 14A, 14B, and 14C.

Figure 11:
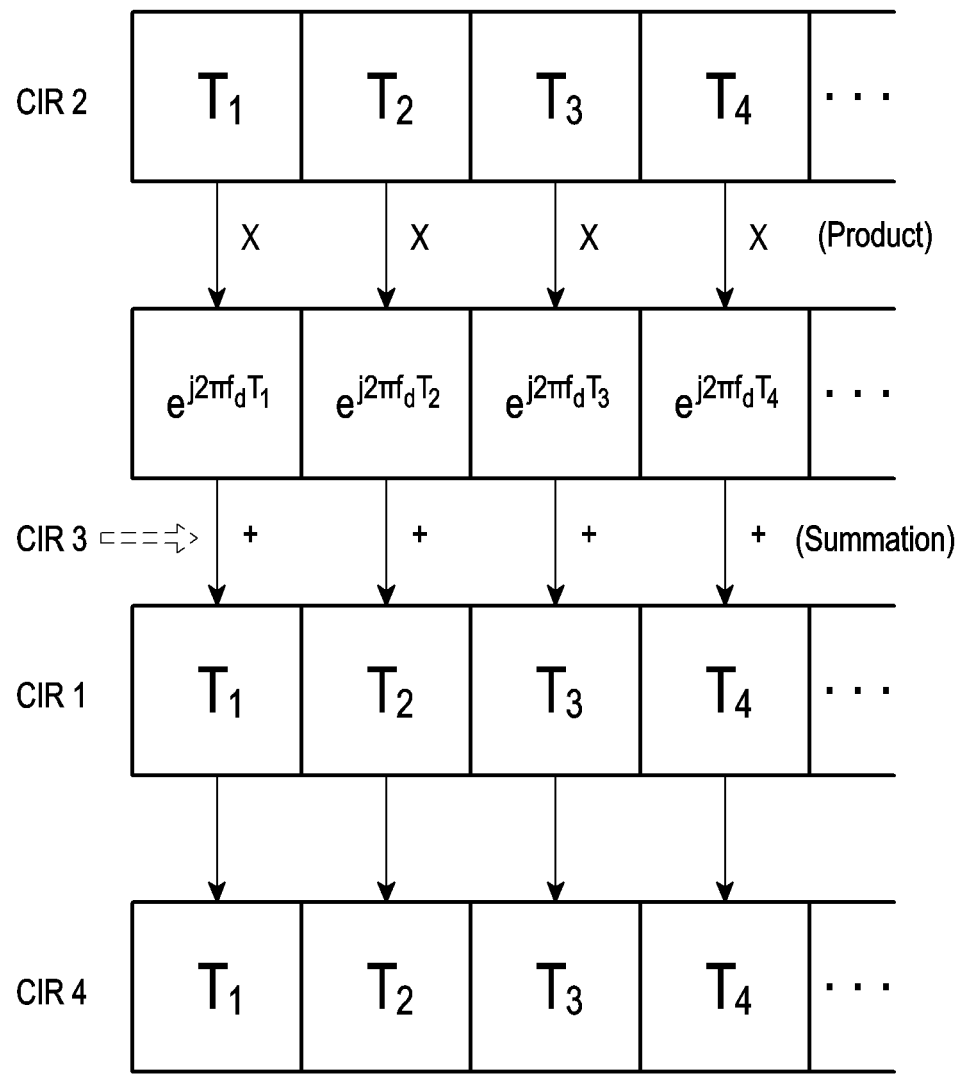
FIG. 11 is a diagram for illustrating a method of acquiring an improved channel impulse response by an electronic device according to an embodiment of the disclosure.

FIG. 11 is a diagram for illustrating a method of acquiring an improved channel impulse response by an electronic device according to an embodiment of the disclosure.

Referring to FIG. 11, the electronic device (e.g., the electronic device 101 of FIG. 1) may perform a first calculation (e.g., the product 1050b) in the time domain based on a difference $f_d$ between a first center frequency $f_1$ and a second center frequency $f_2$ with respect to a second channel impulse response (CIR2). According to various embodiments of the disclosure, the channel impulse response (CIR2) may be a channel impulse response estimated from a reflection signal received in a higher frequency band (i.e., having a higher center frequency) from among multiple received reflected signals. According to various embodiments of the disclosure, when FIG. 6A is referred to, the second channel impulse response (CIR 2) may be a sequence in the time domain, in which values of one or more components (e.g., reference numerals 603a and 603b of FIG. 6A) are superimposed. According to various embodiments of the disclosure, the electronic device (e.g., the electronic device 101 of FIG. 1) may perform elementwise product with $e^{j2\pi f dT1}$, $e^{j2\pi f dT2}$, $e^{j2\pi f dT3}$, $e^{j2\pi f dT4}$, . . . , or the like at one or more time points ($T_1$, $T_2$, $T_3$, $T_4$, . . . , or the like) with respect to the second channel impulse response (e.g., CIR 2) in the time domain. According to various embodiments of the disclosure, the elementwise product may be the first calculation (e.g., the product 1050*b*) of FIG. 10A.

According to various embodiments of the disclosure, the electronic device (e.g., the electronic device 101 of FIG. 1) may acquire a third channel impulse response (e.g., CIR 3) as a result of the elementwise product of the second channel impulse response (e.g., CIR 2). According to various embodiments of the disclosure, as in the second channel impulse response (e.g., CIR 2), the third channel impulse response (e.g., CIR 3) may be a sequence in the time domain, in which values of one or more components are superimposed. The aforementioned elementwise product may be defined according to Equation 4.

$$h_3(t) = \sum_{k=1}^{n} h_2(t) \times e^{j2\pi f_d t}, (t = T_k)$$

Equation 4

In Equation 4, $T_k$ may be a sampling time at which a second communication circuit (e.g., the second communication circuit 301*b* of FIG. 7) performs a Fourier transform (e.g., fast Fourier transform) and/or an inverse Fourier transform (e.g., inverse fast Fourier transform), based on a start time of an OFDM symbol. $H_2(t)$ may be a sequence in the time domain of the second channel impulse response (e.g., CIR 2). N may be the number of times the second communication circuit (e.g., the second communication circuit 301*b* of FIG. 7) performs sampling. $H_3(t)$ may be a sequence in the time domain of the third channel impulse response (e.g., CIR 3).

According to various embodiments of the disclosure, the electronic device (e.g., the electronic device 101 of FIG. 1) may perform elementwise summation with the first channel impulse response (e.g., CIR 1) at one or more time points (e.g., $T_1, T_2, T_3, T_4, \ldots$, or the like) with respect to the third channel impulse response (e.g., CIR 3) in the time domain. According to various embodiments of the disclosure, the electronic device (e.g., the electronic device 101 of FIG. 1) may acquire a fourth channel impulse response (e.g., CIR 4) as a result of elementwise summation of the third channel impulse response (e.g., CIR 3) and the first channel impulse response (e.g., CIR 1). According to various embodiments of the disclosure, as in the first channel impulse response (e.g., CIR 1), the second channel impulse response (e.g., CIR 2), or the third channel impulse response (e.g., CIR 3), the fourth channel impulse response (e.g., CIR 4) may be a sequence in the time domain, in which values of one or more components are superimposed.

The aforementioned elementwise summation may be defined according to Equation 5.

$$h_4(t) = \sum_{k=1}^{n} h_1(t) + h_3(t), (t = T_k)$$

Equation 5

In Equation 5, $T_k$ may be a sampling time at which a second communication circuit (e.g., the second communication circuit 301*b* of FIG. 7) performs a Fourier transform (e.g., fast Fourier transform) and/or an inverse Fourier transform (e.g., inverse fast Fourier transform), based on a start time of an OFDM symbol. $H_1(t)$ may be a sequence in the time domain of the first channel impulse response (e.g., CIR 1). $H_3(t)$ may be a sequence in the time domain of the third channel impulse response (e.g., CIR 3). N may be the number of times a first communication circuit (e.g., the first communication circuit 301*a* of FIG. 7) or the second communication circuit (e.g., the second communication circuit 301*b* of FIG. 7) performs sampling. $H_4(t)$ may be a sequence in the time domain of the fourth channel impulse response (e.g., CIR 4).

According to various embodiments of the disclosure, the electronic device (e.g., the electronic device 101 of FIG. 1) may concurrently or sequentially receive multiple reflection signals. According to various embodiments of the disclosure, even when multiple reflection signals are sequentially received, since a surrounding environment does not change instantaneously, although a fourth channel impulse response (e.g., CIR 4) is obtained from the multiple sequentially received reflection signals, resolution for sensing the surrounding environment may be improved.

Figure 12:
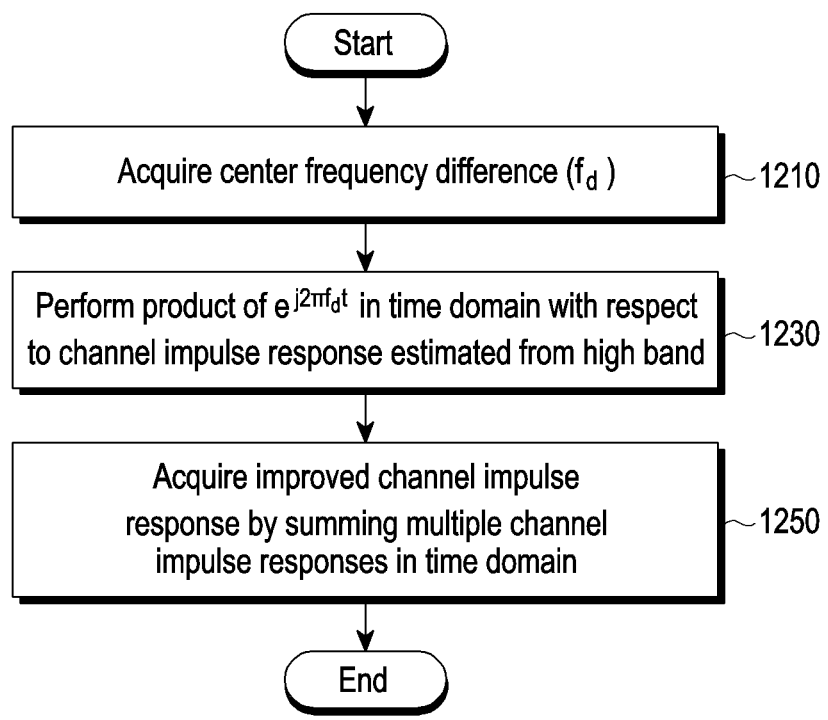
FIG. 12 is a flowchart for illustrating a method of acquiring an improved channel impulse response by an electronic device according to an embodiment of the disclosure.

FIG. 12 is a flowchart for illustrating a method of acquiring an improved channel impulse response by an electronic device according to an embodiment of the disclosure.

Referring to FIG. 12, the electronic device (e.g., the electronic device 101 of FIG. 1) may acquire a center frequency difference $f_d$ in operation 1210. According to various embodiments of the disclosure, the center frequency difference $f_d$ may be a difference between a center frequency $f_1$ of a received first reflection signal and a center frequency $f_2$ of a second reflection signal.

According to various embodiments of the disclosure, in operation 1230, the electronic device (e.g., the electronic device 101 of FIG. 1) may perform product of $e^{j2\pi f_d t}$ in the time domain with respect to a channel impulse response estimated from a high band. According to various embodiments of the disclosure, when the first reflection signal is received in a first band and the second reflection signal is received in a second band that is a high frequency band compared to the first band, the electronic device (e.g., the electronic device 101 of FIG. 1) may perform elementwise product of $e^{j2\pi f_d t}$ in the time domain with respect to a second channel impulse response (e.g., CIR 2) acquired from the second reflection signal. According to various embodiments of the disclosure, the elementwise product of $e^{j2\pi f_d t}$ in the time domain may be the first calculation of FIG. 10A, 10B, or 11. According to various embodiments of the disclosure, the electronic device (e.g., the electronic device 101 of FIG. 1) may acquire a third channel impulse response (e.g., CIR 3) as a result in the time domain.

According to various embodiments of the disclosure, in operation 1250, the electronic device (e.g., the electronic device 101 of FIG. 1) may acquire an improved channel impulse response (e.g., CIR 4) by summing multiple channel impulse responses in the time domain. According to various embodiments of the disclosure, the electronic device (e.g., the electronic device 101 of FIG. 1) may perform summation in the time domain with respect to the first channel impulse response (e.g., CIR 1) and the third channel impulse response (e.g., CIR 3) acquired as the result of the product of $e^{j2\pi f_d t}$ in the time domain. According to various embodiments of the disclosure, the summation in the time domain may be the second calculation of FIG. 10A, 10B, or 11. According to various embodiments of the disclosure, as a result of the second calculation, a fourth channel impulse response (e.g., CIR 4) that is an improved channel impulse response may be acquired.

Figure 13A:
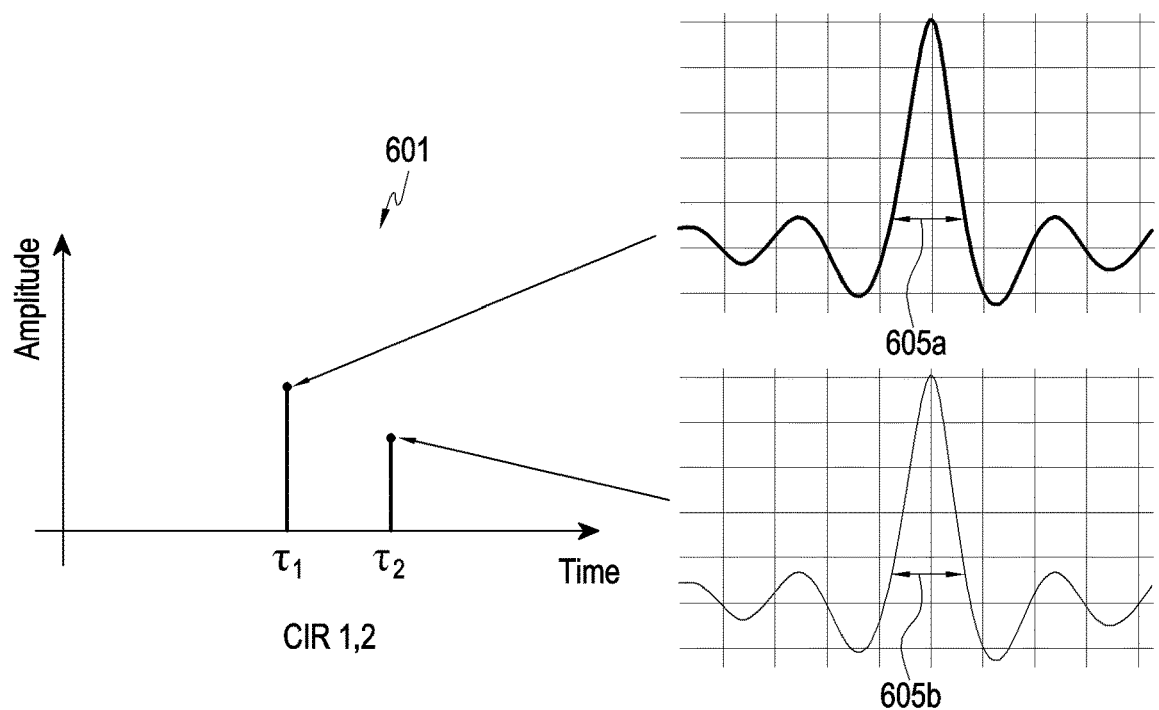
FIGS. 13A and 13B are diagram for illustrating an improved channel impulse response according to an embodiment of the disclosure.
Figure 13B:
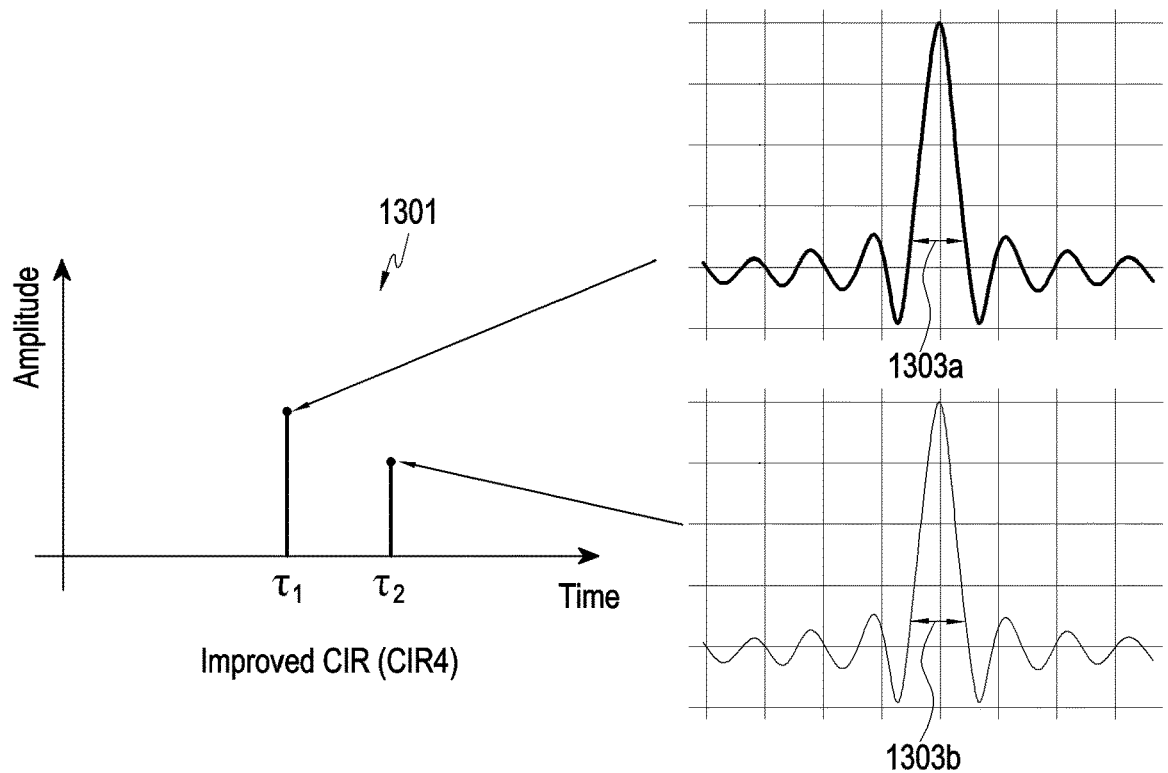

FIGS. 13A and 13B are diagrams for illustrating an improved channel impulse response according to an embodiment of the disclosure.

Referring to FIGS. 13A and 13B, the channel impulse response 601 may be a first channel impulse response (e.g., CIR 1) or a second channel impulse response (e.g., CIR 2).

A channel impulse response 1301 may be an improved channel impulse response (e.g., CIR 4).

When FIG. 6B is also referred to, if a signal is received in a finite (i.e., limited) bandwidth, as shown in diagrams on the right side of FIGS. 13A and 13B, a phenomenon (i.e., a spreading phenomenon) in which each component affects a surrounding time component (e.g., $\tau_1$ or $\tau_2$) of the channel impulse response may occur.

According to various embodiments of the disclosure, a degree of spreading phenomenon is inversely proportional to a size of the bandwidth in which the signal is transmitted and/or received, and as described in FIG. 10A, sensing of the surrounding environment by using a fourth channel impulse response (e.g., CIR 4) may be the same as sensing of the surrounding environment in a bandwidth up to twice the bandwidth of each of the first band or the second band. Therefore, the degree 1303a or 1303b of spreading phenomenon of the fourth channel impulse response (e.g., CIR 4) may be smaller than the degree 605a of spreading phenomenon of the first channel impulse response (e.g., CIR 1) or the degree 605b of spreading phenomenon of the second channel impulse response (e.g., CIR 2). Accordingly, the resolution for sensing the surrounding environment may be improved.

Figure 14A:
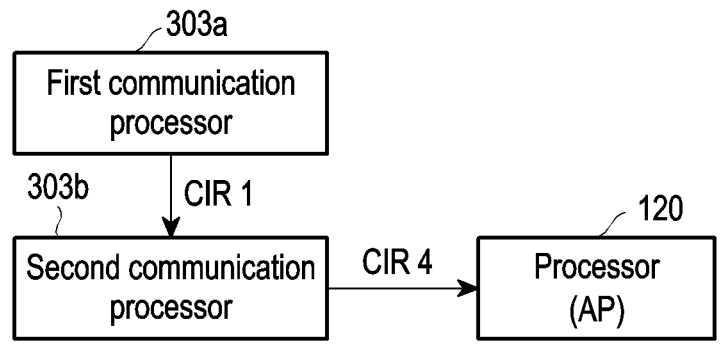
FIG. 14A is a block diagram for illustrating a method of acquiring an improved channel impulse response according to an embodiment of the disclosure.

FIG. 14A is a block diagram for illustrating a method of acquiring an improved channel impulse response according to an embodiment of the disclosure.

Referring to FIG. 14A, the first communication processor 303a may estimate a first channel impulse response (e.g., CIR 1) from a first reflection signal received in a first band, and may provide the first channel impulse response (e.g., CIR 1) to the second communication processor 303b.

According to various embodiments of the disclosure, the second communication processor 303b may estimate a second channel impulse response (e.g., CIR 2) from a second reflection signal received in a second band. According to various embodiments of the disclosure, the second communication processor 303b may acquire the first channel impulse response (e.g., CIR 1) from the first communication processor 303a. According to various embodiments of the disclosure, the second communication processor 303b may acquire, from at least one of the first communication processor 303a or the processor 120, information on the first band in which the first reflection signal is received. For example, the information on the first band in which the first reflection signal is received may include a center frequency (e.g., $f_1$) of the first band. According to various embodiments of the disclosure, the second communication processor 303b may acquire, from at least one of the first communication processor 303a or the processor 120, information on a difference $f_d$ between a center frequency of the first band in which the first reflection signal is received and a center frequency of the second band in which the second reflection signal is received.

According to various embodiments of the disclosure, the second communication processor 303b may acquire a third channel impulse response (e.g., CIR 3) by performing a first calculation (e.g., the product 1050b of FIG. 10B) with respect to the second channel impulse response (e.g., CIR 2).

According to various embodiments of the disclosure, the second communication processor 303b may acquire a fourth channel impulse response (e.g., CIR 4) by performing a second calculation (e.g., the summation 1070b of FIG. 10B) with respect to the first channel impulse response (e.g., CIR 1) and the third channel impulse response (e.g., CIR 3).

According to various embodiments of the disclosure, the second communication processor 303b may provide the acquired fourth channel impulse response (e.g., CIR 4) to the processor 120, and the processor 120 may acquire information on a surrounding environment by using the fourth channel impulse response (e.g., CIR 4).

Figure 14B:
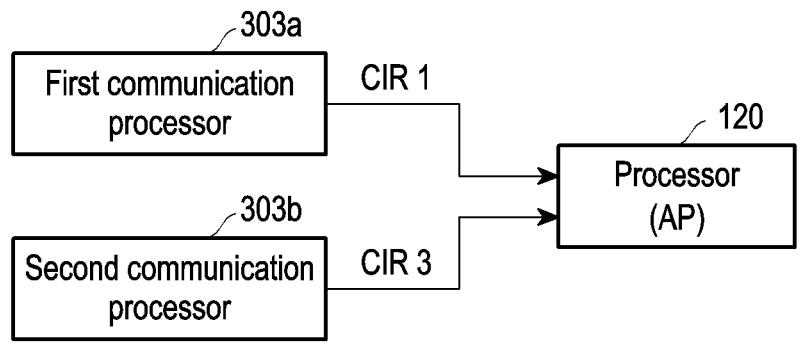
FIG. 14B is a block diagram for illustrating a method of acquiring an improved channel impulse response according to an embodiment of the disclosure.

FIG. 14B is a block diagram for illustrating a method of acquiring an improved channel impulse response according to an embodiment of the disclosure.

Referring to FIG. 14B, according to various embodiments of the disclosure, the first communication processor 303a may estimate a first channel impulse response (e.g., CIR 1) and may provide the first channel impulse response (e.g., CIR 1) to processor 120.

According to various embodiments of the disclosure, the second communication processor 303b may estimate a second channel impulse response (e.g., CIR 2) from a second reflection signal received in a second band. According to various embodiments of the disclosure, the second communication processor 303b may acquire, from at least one of the first communication processor 303a or the processor 120, information on the first band in which the first reflection signal is received. For example, the information on the first band in which the first reflection signal is received may include a center frequency (e.g., $f_1$) of the first band. According to various embodiments of the disclosure, the second communication processor 303b may acquire, from at least one of the first communication processor 303a or the processor 120, information on a difference $f_d$ between a center frequency of the first band in which the first reflection signal is received and a center frequency of the second band in which the second reflection signal is received.

According to various embodiments of the disclosure, the second communication processor 303b may acquire a third channel impulse response (e.g., CIR 3) by performing a first calculation (e.g., the product 1050b of FIG. 10B) with respect to the second channel impulse response (e.g., CIR 2), and may provide the third channel impulse response (e.g., CIR 3) to the processor 120.

According to various embodiments of the disclosure, the processor 120 may acquire the first channel impulse response (e.g., CIR 1) from the first communication processor 303a and may acquire the third channel impulse response (e.g., CIR 3) from the second communication processor 303b.

According to various embodiments of the disclosure, the processor 120 may acquire a fourth channel impulse response (e.g., CIR 4) by performing a second calculation (e.g., the summation 1070b of FIG. 10B) with respect to the first channel impulse response (e.g., CIR 1) and the third channel impulse response (e.g., CIR 3).

According to various embodiments of the disclosure, the processor 120 may acquire information on a surrounding environment by using the acquired fourth channel impulse response (e.g., CIR 4).

Figure 14C:
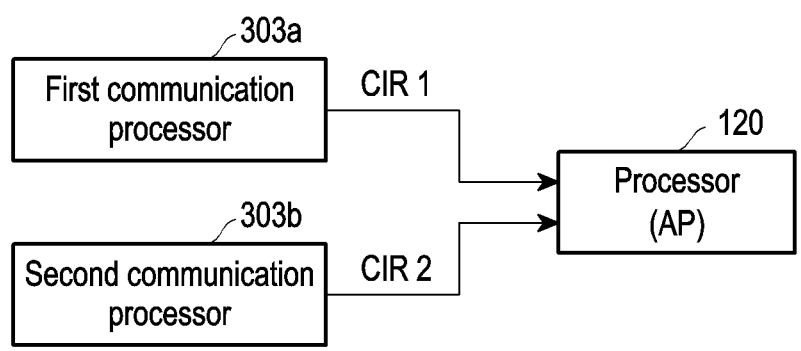
FIG. 14C is a block diagram for illustrating a method of acquiring an improved channel impulse response according to an embodiment of the disclosure.

FIG. 14C is a block diagram for illustrating a method of acquiring an improved channel impulse response according to an embodiment of the disclosure.

Referring to FIG. 14C, the first communication processor 303a may estimate a first channel impulse response (e.g., CIR 1) and may provide the first channel impulse response (e.g., CIR 1) to processor 120.

According to various embodiments of the disclosure, the second communication processor 303b may estimate a second channel impulse response (e.g., CIR 2) and may provide the second channel impulse response (CIR 2) to the processor 120.

According to various embodiments of the disclosure, the processor 120 may acquire the first channel impulse response (e.g., CIR 1) from the first communication processor 303a, and may acquire the second channel impulse response (e.g., CIR 2) from the second communication processor 303b.

According to various embodiments of the disclosure, the processor 120 may acquire information on a center frequency (e.g., $f_1$) of the first band from the first communication processor 303a. According to various embodiments of the disclosure, the processor 120 may acquire information on a center frequency (e.g., $f_2$) of the second band from the second communication processor 303b. According to various embodiments of the disclosure, the processor 120 may identify a center frequency difference (e.g., $f_d$), based on the acquired information. According to one embodiment of the disclosure, when it is necessary to acquire information on a surrounding environment (e.g., when requested by an application), the processor 120 may request information on the center frequency (e.g., $f_1$) of the first band from the first communication processor 303a, and may request information on the center frequency (e.g., $f_2$) of the second band from the second communication processor 303b.

According to various embodiments of the disclosure, the processor 120 may acquire a third channel impulse response (e.g., CIR 3) by performing a first calculation (e.g., the product 1050b of FIG. 10B) with respect to the second channel impulse response (e.g., CIR 2), based on the identified center frequency difference (e.g., $f_d$).

According to various embodiments of the disclosure, the processor 120 may acquire a fourth channel impulse response (e.g., CIR 4) by performing a second calculation (e.g., the summation 1070b of FIG. 10B) with respect to the first channel impulse response (e.g., CIR 1) and the third channel impulse response (e.g., CIR 3).

According to various embodiments of the disclosure, the processor 120 may acquire information on a surrounding environment by using the acquired fourth channel impulse response (e.g., CIR 4).

Figure 15:
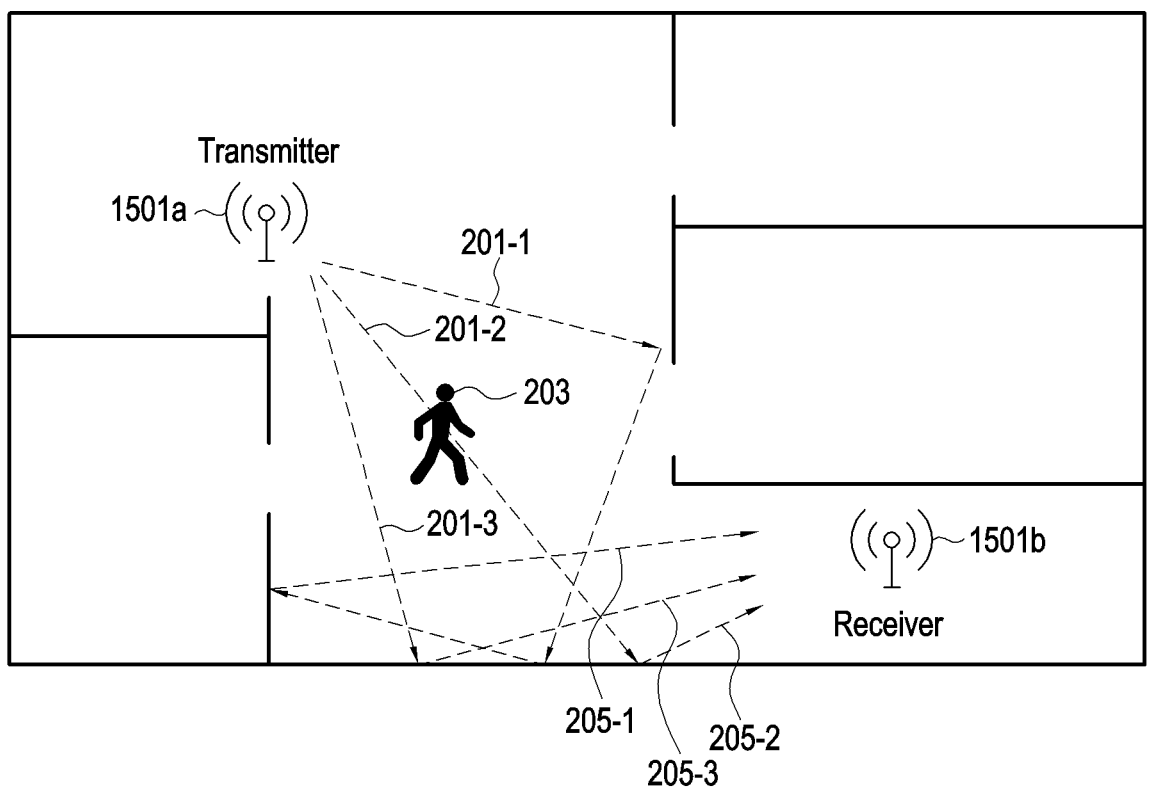
FIG. 15 is a diagram for illustrating a method of sensing a surrounding environment by an electronic device according to an embodiment of the disclosure.

FIG. 15 is a diagram for illustrating a method of sensing a surrounding environment by an electronic device according to an embodiment according to an embodiment of the disclosure.

Referring to FIG. 15, a first electronic device (e.g., "transmitter") 1501a may include the transmitter 401a of FIG. 4A. According to various embodiments of the disclosure, a second electronic device (e.g., "receiver") 1501b may include the receiver 401b of FIG. 4A.

According to various embodiments of the disclosure, the first electronic device 1501a may be the external electronic device 207 of FIG. 2B. According to various embodiments of the disclosure, the second electronic device 1501b may be the electronic device 101 of FIG. 2B. According to various embodiments of the disclosure, the first electronic device 1501a may include multiple transmitters (e.g., the transmitter 401a of FIG. 4A) to transmit multiple signals (e.g., reference numeral 201-1, 201-2, or 201-3) via several links (i.e., different bands) according to an MLO. According to various embodiments of the disclosure, the second electronic device 1501b may include multiple receivers (e.g., the receiver 401b of FIG. 4B) to receive multiple reflection signals (e.g., reference numeral 205-1, 205-2, or 205-3) via several links (i.e., different bands) according to the MLO.

According to various embodiments of the disclosure, multiple reflection signals (e.g., reference numeral 205-1, 205-2, or 205-3) may be signals generated by reflection of multiple signals (e.g., reference numeral 201-1, 201-2, or 201-3) by a geographic feature (e.g., a wall) and/or an object 203 (e.g., a person).

According to various embodiments of the disclosure, the second electronic device 1501b may acquire a channel impulse response (e.g., a fourth channel impulse response) by receiving the multiple reflection signals (e.g., reference numeral 205-1, 205-2, or 205-3). According to various embodiments of the disclosure, the second electronic device 1501b may acquire information on a surrounding environment from the acquired channel impulse response (e.g., the fourth channel impulse response).

According to various embodiments of the disclosure, the multiple signals (e.g., reference numeral 201-1, 201-2, or 201-3) and the multiple reflection signals (e.g., reference numeral 205-1, 205-2, or 205-3) may include additional information in a data field (e.g., the data field 517 of FIG. 5). For example, the additional information may include information on a time point at which signals (e.g., multiple signals (e.g., 201-1, 201-2, or 201-3)) are transmitted. According to various embodiments of the disclosure, the second electronic device 1501b may identify delay times of respective multiple signals (e.g., reference numeral 201-1, 201-2, or 201-3) by using information on the time points at which the multiple signals (e.g., reference numeral 201-1, 201-2, or 201-3) are transmitted.

According to various embodiments of the disclosure, when a change occurs in the surrounding environment, the second electronic device 1501b may acquire information on the surrounding environment and then acquire a new channel impulse response (e.g., a fourth channel impulse response) again from the received multiple reflection signals, and may identify the change in the surrounding environment by comparing the previously acquired channel impulse response with the new channel impulse response. For example, a case where a change occurs in the surrounding environment may include at least one of a case where a new object different from the object 203 enters the surrounding environment, a case where the object 203 moves or disappears, or a case where a structure of a geographic feature is changed.

According to various embodiments of the disclosure, when the second electronic device 1501b includes multiple transmitters (e.g., the transmitter 401a of FIG. 4A) and multiple receivers (e.g., the receiver 401b of FIG. 4B), the second electronic device 1501b may transmit multiple signals (e.g., reference numeral 201-1, 201-2, or 201-3) via several links (i.e., different bands) according to an MLO, and may receive multiple reflection signals (e.g., reference numeral 205-1, 205-2, or 205-3) via several links (i.e., different bands) according to the MLO so as to identify a change in the surrounding environment.

According to various embodiments of the disclosure, an electronic device (e.g., the electronic device 101 of FIG. 1) may include a first communication circuit (e.g., the first communication circuit 301a of FIG. 7), a second communication circuit (e.g., the second communication circuit 301b of FIG. 7), and at least one processor (e.g., the processor 120 of FIG. 1) operatively connected to the first communication circuit (e.g., the first communication circuit 301a of FIG. 7) and the second communication circuit (e.g., the second communication circuit 301b of FIG. 7), wherein the first communication circuit (e.g., the first communication circuit 301a of FIG. 7) is configured to receive, in a first band (e.g., the first band of FIG. 7), a first reflection signal (e.g., the first reflection signal 205a of FIG. 7) reflected by at least one object (e.g., the object 203 of FIG. 2A or 2B), and estimate, based on the received first reflection signal (e.g., the first reflection signal 205a of FIG. 7), a first channel impulse response (e.g., CIR 1 of FIG. 10A) corresponding to the first reflection signal (e.g., the first reflection signal 205a of FIG. 7), the second communication circuit (e.g., the second communication circuit 301b of FIG. 7) is configured to receive, in a second band (e.g., the second band of FIG. 7), a second reflection signal (e.g., the second reflection signal 205b of FIG. 7) reflected by the at least one object (e.g., the object 203 of FIG. 2A or 2B), estimate, based on the received second reflection signal (e.g., the second reflection signal 205b of FIG. 7), a second channel impulse response (e.g., CIR 2 of FIG. 10A) corresponding to the second reflection signal (e.g., the second reflection signal 205b of FIG. 7), and acquire, in response to the second channel impulse response (e.g., CIR 2 of FIG. 10A), a third channel impulse response (e.g., CIR 3 of FIG. 10A) for which a first calculation (e.g., the product 1050b of FIG. 10B) based on a first center frequency of the first band (e.g., the first band of FIG. 7) and a second center frequency of the second band (e.g., the second band of FIG. 7) has been performed, and the at least one processor (e.g., the processor 120 of FIG. 1) is configured to acquire a fourth channel impulse response (e.g., CIR 4 of FIG. 10A) based on the first channel impulse response and the third channel impulse response (e.g., CIR 3 of FIG. 10A).

According to various embodiments of the disclosure, the second center frequency may be greater than the first center frequency.

According to various embodiments of the disclosure, the second communication circuit (e.g., the second communication circuit 301b of FIG. 7) may be configured to acquire the third channel impulse response (e.g., CIR 3 of FIG. 10A), based on a difference between the first center frequency and the second center frequency.

According to various embodiments of the disclosure, the second communication circuit (e.g., the second communication circuit 301b of FIG. 7) may be further configured to acquire information on the first center frequency from at least one of the first communication circuit (e.g., the first communication circuit 301a of FIG. 7) or the at least one processor (e.g., the processor 120 of FIG. 1), and identify the difference between the first center frequency and the second center frequency, based on the acquired information on the first center frequency.

According to various embodiments of the disclosure, the second communication circuit (e.g., the second communication circuit 301b of FIG. 7) may be configured to perform a first calculation (e.g., the product 1050b of FIG. 10B) in the time domain based on the first center frequency and the second center frequency with respect to the second channel impulse response (e.g., CIR 2 of FIG. 10A), and acquire the third channel impulse response (e.g., CIR 3 of FIG. 10A), based on the first calculation (e.g., the product 1050b of FIG. 10B).

According to various embodiments of the disclosure, the second communication circuit (e.g., the second communication circuit 301b of FIG. 7) may be further configured to acquire the fourth channel impulse response (e.g., CIR 4 of FIG. 10A) by performing a second calculation (e.g., the summation 1070b of FIG. 10B) of summing the first channel impulse response (e.g., CIR 1 of FIG. 10A) and the third channel impulse response (e.g., CIR 3 of FIG. 10A), and provide the acquired fourth channel impulse response (e.g., CIR 4 of FIG. 10A) to the at least one processor (e.g., the processor 120 of FIG. 1).

According to various embodiments of the disclosure, the at least one processor (e.g., the processor 120 in FIG. 1) may be configured to receive the fourth channel impulse response (e.g., CIR 4 in FIG. 10A) from the second communication circuit (e.g., the second communication circuit 301b of FIG. 7) or perform a second calculation (e.g., the summation (1070b) of FIG. 10B) of summing the third channel impulse response (e.g., CIR 3 in FIG. 10A) and the first channel impulse response (e.g., CIR 1 in FIG. 10A) received from the second communication circuit (e.g., the second communication circuit 301b of FIG. 7), so as to acquire the fourth channel impulse response (e.g., CIR 4 in FIG. 10A).

According to various embodiments of the disclosure, the first communication circuit (e.g., the first communication circuit 301a of FIG. 7) may be configured to identify a first LTF field (e.g., HE-LTF 515 of FIG. 5) of the first reflection signal (e.g., the first reflection signal 205a of FIG. 7), and estimate the first channel impulse response (e.g., CIR 1 of FIG. 10A), based on the identified first LTF field (e.g., HE-LTF 515 of FIG. 5), and the second communication circuit (e.g., the second communication circuit 301b of FIG. 7) may be configured to identify a second LTF field (e.g., HE-LTF 515 of FIG. 5) of the second reflection signal (e.g., the second reflection signal 205b of FIG. 7), and estimate the second channel impulse response (e.g., CIR 2 of FIG. 10A), based on the identified second LTF field (e.g., HE-LTF 515 of FIG. 5).

According to various embodiments of the disclosure, the first communication circuit (e.g., the first communication circuit 301a of FIG. 7) may be configured to identify an amplitude and/or a phase of at least one first sub-carrier that transmits the first LTF field (e.g., HE-LTF 515 of FIG. 5) so as to estimate the first channel impulse response (e.g., CIR 1 of FIG. 10A), and the second communication circuit (e.g., the second communication circuit 301b of FIG. 7) is configured to identify an amplitude and/or a phase of at least one second sub-carrier that transmits the second LTF field (e.g., HE-LTF 515 of FIG. 5) so as to estimate the second channel impulse response (e.g., CIR 2 of FIG. 10A).

According to various embodiments of the disclosure, the at least one processor (e.g., the processor 120 of FIG. 1) may be further configured to identify an attribute of the at least one object (e.g., the object 203 of FIG. 2A or 2B), based on the fourth channel impulse response (e.g., CIR 4 of FIG. 10A).

According to various embodiments of the disclosure, at least one of the first reflection signal (e.g., the first reflection signal 205a of FIG. 7) or the second reflection signal (e.g., the second reflection signal 205b of FIG. 7) may be generated by reflection of at least one communication signal by the at least one object (e.g., the object 203 of FIG. 2A or 2B), the at least one communication signal being transmitted by at least one of the electronic device (e.g., the electronic device 101 of FIG. 1) or an external electronic device (e.g., the external electronic device 207 of FIGS. 2A and 2B).

According to various embodiments of the disclosure, a method for controlling an electronic device (e.g., the electronic device 101 of FIG. 1) may include receiving, in a first band (e.g., the first band of FIG. 7), a first reflection signal (e.g., the first reflection signal 205a of FIG. 7) reflected by at least one object (e.g., the object 203 of FIG. 2A or 2B), estimating, based on the received first reflection signal (e.g., the first reflection signal 205a of FIG. 7), a first channel impulse response (e.g., CIR 1 of FIG. 10A) corresponding to the first reflection signal (e.g., the first reflection signal 205a of FIG. 7), receiving, in a second band (e.g., the second band of FIG. 7), a second reflection signal (e.g., the second reflection signal 205b of FIG. 7) reflected by the at least one object (e.g., the object 203 of FIG. 2A or 2B), estimating, based on the received second reflection signal (e.g., the second reflection signal 205b of FIG. 7), a second channel impulse response (e.g., CIR 2 of FIG. 10A) corresponding to the second reflection signal (e.g., the second reflection signal 205b of FIG. 7), acquiring, in response to the second channel impulse response (e.g., CIR 2 of FIG. 10A), a third channel impulse response (e.g., CIR 3 of FIG. 10A) for which a first calculation (e.g., the product 1050b of FIG. 10B) based on a first center frequency of the first band (e.g., the first band of FIG. 7) and a second center frequency of the second band (e.g., the second band of FIG. 7) has been performed, and acquiring a fourth channel impulse response (e.g., CIR 4 of FIG. 10A) based on the first channel impulse response (e.g., CIR 1 of FIG. 10A) and the third channel impulse response (e.g., CIR 3 of FIG. 10A).

According to various embodiments of the disclosure, the second center frequency may be greater than the first center frequency.

According to various embodiments of the disclosure, the method of controlling the electronic device (e.g., the electronic device 101 of FIG. 1) may include acquiring the third channel impulse response (e.g., CIR 3 of FIG. 10A), based on a difference between the first center frequency and the second center frequency.

According to various embodiments of the disclosure, the method of controlling the electronic device (e.g., the electronic device 101 of FIG. 1) may further include acquiring information on the first center frequency, and identifying the difference between the first center frequency and the second center frequency, based on the acquired information on the first center frequency.

According to various embodiments of the disclosure, the method of controlling the electronic device (e.g., the electronic device 101 of FIG. 1) may further include performing a first calculation (e.g., the product 1050b of FIG. 10B) in the time domain based on the first center frequency and the second center frequency with respect to the second channel impulse response (e.g., CIR 2 of FIG. 10A), and acquiring the third channel impulse response (e.g., CIR 3 of FIG. 10A), based on the first calculation (e.g., the product 1050b of FIG. 10B).

According to various embodiments of the disclosure, the method of controlling the electronic device (e.g., the electronic device 101 of FIG. 1) may further include acquiring the fourth channel impulse response (e.g., CIR 4 of FIG. 10A) by performing a second calculation (e.g., the summation 1070b of FIG. 10B) of summing the first channel impulse response (e.g., CIR 1 of FIG. 10A) and the third channel impulse response (e.g., CIR 3 of FIG. 10A), and providing the acquired fourth channel impulse response (e.g., CIR 4 of FIG. 10A).

According to various embodiments of the disclosure, the method of controlling the electronic device (e.g., the electronic device 101 of FIG. 1) may include identifying a first LTF field (e.g., HE-LTF 515 of FIG. 5) of the first reflection signal (e.g., the first reflection signal 205a of FIG. 7) and estimating the first channel impulse response (e.g., CIR 1 of FIG. 10A), based on the identified first LTF field (e.g., HE-LTF 515 of FIG. 5), and identifying a second LTF field (e.g., HE-LTF 515 of FIG. 5) of the second reflection signal (e.g., the second reflection signal 205b of FIG. 7) and estimating the second channel impulse response (e.g., CIR 2 of FIG. 10A), based on the identified second LTF field (e.g., HE-LTF 515 of FIG. 5).

According to various embodiments of the disclosure, an electronic device (e.g., the electronic device 101 of FIG. 1) may include a first communication circuit (e.g., the first communication circuit 301a of FIG. 7), a second communication circuit (e.g., the second communication circuit 301b of FIG. 7), and at least one processor (e.g., the processor 120 of FIG. 1) operatively connected to the first communication circuit (e.g., the first communication circuit 301a of FIG. 7) and the second communication circuit, wherein the first communication circuit (e.g., the first communication circuit 301a of FIG. 7) is configured to receive, in a first band (e.g., the first band of FIG. 7), a first reflection signal (e.g., the first reflection signal 205a of FIG. 7) reflected by at least one object (e.g., the object 203 of FIG. 2A or 2B), and estimate, based on the received first reflection signal (e.g., the first reflection signal 205a of FIG. 7), a first channel impulse response (e.g., CIR 1 of FIG. 10A) corresponding to the first reflection signal (e.g., the first reflection signal 205a of FIG. 7), the second communication circuit (e.g., the second communication circuit 301b of FIG. 7) is configured to receive, in a second band (e.g., the second band of FIG. 7), a second reflection signal (e.g., the second reflection signal 205b of FIG. 7) reflected by the at least one object (e.g., the object 203 of FIG. 2A or 2B), and estimate, based on the received second reflection signal (e.g., the second reflection signal 205b of FIG. 7), a second channel impulse response (e.g., CIR 2 of FIG. 10A) corresponding to the second reflection signal (e.g., the second reflection signal 205b of FIG. 7), and the at least one processor (e.g., the processor 120 of FIG. 1) is configured to acquire, in response to the second channel impulse response (e.g., CIR 2 of FIG. 10A), a third channel impulse response (e.g., CIR 3 of FIG. 10A) by performing calculation (e.g., the product 1050b and/or summation 1070b of FIG. 10B) based on a first center frequency of the first band (e.g., the first band of FIG. 7) and a second center frequency of the second band (e.g., the second band of FIG. 7), and acquire a fourth channel impulse response (e.g., CIR 4 of FIG. 10A) based on the first channel impulse response (e.g., CIR 1 of FIG. 10A) and the third channel impulse response (e.g., CIR 3 of FIG. 10A).

According to various embodiments of the disclosure, the at least one processor (e.g., the processor 120 of FIG. 1) may be configured to acquire the third channel impulse response (e.g., CIR 3 of FIG. 10A), based on a difference between the first center frequency and the second center frequency.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first communication circuit;
a second communication circuit; and
at least one processor operatively connected to the first communication circuit and the second communication circuit,
wherein the first communication circuit is configured to:
receive, in a first band, a first reflection signal reflected by at least one object, and
based on the received first reflection signal, obtain a first channel impulse response corresponding to the first reflection signal,
wherein the second communication circuit is configured to:
receive, in a second band, a second reflection signal reflected by the at least one object,
based on the received second reflection signal, obtain a second channel impulse response corresponding to the second reflection signal, and
obtain a third channel impulse response based on a first calculation using the second channel impulse response, a first frequency of the first band and a second frequency of the second band, and
wherein the at least one processor is configured to:
obtain a fourth channel impulse response based on the first channel impulse response and the third channel impulse response.

2. The electronic device of claim 1, wherein the second frequency is greater than the first frequency.

3. The electronic device of claim 1, wherein the second communication circuit is further configured to obtain the third channel impulse response, based on a difference between the first frequency and the second frequency.

4. The electronic device of claim 3, wherein the second communication circuit is further configured to:
obtain information on the first frequency from at least one of the first communication circuit or the at least one processor, and
identify the difference between the first frequency and the second frequency, based on the information on the first frequency.

5. The electronic device of claim 1, wherein the second communication circuit is further configured to:
perform a first calculation in a time domain based on the first frequency and the second frequency with respect to the second channel impulse response, and
obtain the third channel impulse response, based on the first calculation.

6. The electronic device of claim 1, wherein the second communication circuit is further configured to:
obtain the fourth channel impulse response by performing a second calculation of summing the first channel impulse response and the third channel impulse response, and
provide the acquired fourth channel impulse response to the at least one processor.

7. The electronic device of claim 1, wherein the at least one processor is further configured to:
  receive the fourth channel impulse response from the second communication circuit, or
  perform a second calculation of summing the third channel impulse response and the first channel impulse response received from the second communication circuit, so as to obtain the fourth channel impulse response.

8. The electronic device of claim 1,
wherein the first communication circuit is further configured to:
  identify a first long training field (LTF) of the first reflection signal, and
  obtain the first channel impulse response, based on the identified first LTF, and
wherein the second communication circuit is further configured to:
  identify a second LTF of the second reflection signal, and
  obtain the second channel impulse response, based on the identified second LTF.

9. The electronic device of claim 8,
wherein the first communication circuit is further configured to identify an amplitude and/or a phase of at least one first sub-carrier that transmits the first LTF so as to obtain the first channel impulse response, and
wherein the second communication circuit is further configured to identify an amplitude and/or a phase of at least one second sub-carrier that transmits the second LTF so as to obtain the second channel impulse response.

10. The electronic device of claim 1, wherein the at least one processor is further configured to identify an attribute of the at least one object, based on the fourth channel impulse response.

11. The electronic device of claim 1, wherein at least one of the first reflection signal or the second reflection signal is generated by reflection of at least one communication signal by the at least one object, the at least one communication signal being transmitted by at least one of the electronic device or an external electronic device.

12. A method for controlling an electronic device, the method comprising:
  receiving, in a first band, a first reflection signal reflected by at least one object;
  based on the received first reflection signal, obtaining a first channel impulse response corresponding to the first reflection signal;
  receiving, in a second band, a second reflection signal reflected by the at least one object;
  based on the received second reflection signal, obtaining a second channel impulse response corresponding to the second reflection signal;
  obtaining a third channel impulse response based on a first calculation using the second channel impulse response, a first frequency of the first band and a second frequency of the second band; and
  obtaining a fourth channel impulse response based on the first channel impulse response and the third channel impulse response.

13. The method of claim 12, wherein the second frequency is greater than the first frequency.

14. The method of claim 12, further comprising obtaining the third channel impulse response, based on a difference between the first frequency and the second frequency.

15. The method of claim 14, further comprising:
obtaining information on the first frequency; and
identifying the difference between the first frequency and the second frequency, based on the obtained information on the first center frequency.

* * * * *